United States Patent
Moriyama et al.

(10) Patent No.: US 10,279,248 B2
(45) Date of Patent: May 7, 2019

(54) SYSTEM AND METHOD FOR VIDEO GAME USER REGISTRATION BASED ON GAME PROGRESS

(71) Applicant: GREE, Inc., Minato-ku, Tokyo (JP)

(72) Inventors: Midori Moriyama, Minato-ku (JP); Shuhei Sato, Mintao-ku (JP)

(73) Assignee: GREE, Inc., Tokyo (JP)

( * ) Notice: Subject to any disclaimer, the term of this patent is extended or adjusted under 35 U.S.C. 154(b) by 569 days.

(21) Appl. No.: 14/641,905

(22) Filed: Mar. 9, 2015

(65) Prior Publication Data

US 2015/0375111 A1 Dec. 31, 2015

(30) Foreign Application Priority Data

Jun. 30, 2014 (JP) .................. 2014-135350

(51) Int. Cl.
*G06F 17/00* (2006.01)
*A63F 13/213* (2014.01)
(Continued)

(52) U.S. Cl.
CPC ............ *A63F 13/213* (2014.09); *A63F 13/30* (2014.09); *A63F 13/42* (2014.09)

(58) Field of Classification Search
CPC ......... A63F 13/213; A63F 13/42; A63F 13/30
See application file for complete search history.

(56) References Cited

U.S. PATENT DOCUMENTS 9,757,651 B2 * 9/2017 Song ................. A63F 13/48
2012/0021829 A1 * 1/2012 Shoham .............. A63F 13/655
463/31

(Continued)

FOREIGN PATENT DOCUMENTS

JP 11-207031 A 8/1999
JP 2004-242955 A 9/2004
(Continued)

OTHER PUBLICATIONS

Katkoff, Michail. How Puzzle & Dragons Does It. Gamasutra.com. Online. Feb. 25, 2013. Accessed via the Internet. Accessed Jul. 24, 2017. <URL: http://www.gamasutra.com/blogs/MichailKatkoff/20130225/187247/How_Puzzle_Dragons_Does_lt.php>.*

(Continued)

*Primary Examiner* — Dmitry Suhol
*Assistant Examiner* — Carl V Larsen
(74) *Attorney, Agent, or Firm* — Oblon, McClelland, Maier & Neustadt, L.L.P.

(57) ABSTRACT

A control method performed by a computer including a storage module and configured to control progress of a game played by a user registered in an application, includes storing, in the storage module, identification information of each of a plurality of users in association with registration information indicating whether the user is registered in the application, retrieving a game progress request including identification information of a first user from a first terminal device of the first user, determining whether or not the first user is registered in the application, transmitting display data for displaying a game screen used in the game to the first terminal device when the first user is registered in the application, and transmitting display data for displaying a registration screen for registering the first user in the application to the first terminal device, when the first user is not registered in the application.

15 Claims, 14 Drawing Sheets

(51) Int. Cl.
*A63F 13/42* (2014.01)
*A63F 13/30* (2014.01)

(56) References Cited

U.S. PATENT DOCUMENTS

| | | | | |
|---|---|---|---|---|
| 2012/0178514 | A1* | 7/2012 | Schulzke | G07F 17/3295 463/17 |
| 2012/0302324 | A1* | 11/2012 | Guinn | G07F 17/3255 463/25 |
| 2013/0006737 | A1* | 1/2013 | Goldberg | G06Q 30/02 705/14.12 |
| 2014/0067554 | A1* | 3/2014 | Heppding | G06Q 30/0276 705/14.72 |
| 2014/0128163 | A1* | 5/2014 | Almog | A63F 13/12 463/42 |
| 2014/0187324 | A1* | 7/2014 | Masuda | A63F 13/10 463/31 |
| 2014/0256424 | A1* | 9/2014 | Yamada | A63F 13/795 463/29 |
| 2014/0357356 | A1* | 12/2014 | Horie | A63F 13/00 463/31 |

FOREIGN PATENT DOCUMENTS

| | | |
|---|---|---|
| JP | 2011-101775 A | 5/2011 |
| JP | 2013-230292 A | 11/2013 |

OTHER PUBLICATIONS

Office action for corresponding Japanese Patent Application No. 2014-135350, dated Sep. 16, 2014, including English translation, 9pp.

Office action for corresponding Japanese Patent Application No. 2015-030919, dated Mar. 24, 2015, including English translation, 7pp.

Androider+; "Revisit the basics—A secure manner of LINE"; Oct. 2013 Issue, Impress Japan Corporation, Aug. 19, 2013, vol.3/No. 5/14th issue, pp. 84-91.

Androider+; "Revisit the basics—A secure manner of LINE"; Oct. 2013 Issue; Impress Japan Corporation; Aug. 19, 2013; vol. 3; No. 5; 14th issue; pp. 84-91 including English translation; 11 pp.

Notification of Reasons for Refusal issued in corresponding Japanese Application No. 2015-181882 dated Apr. 17, 2018.

The 3$^{rd}$ Phase [online] friend invitation campaign, and phantasy star on-line 2 Pre years site, Sep. 4, 2013 and URL:http://pso2.jp/players/news/2068 Internet </> (Document showing a well-known technique) (with partial English translation).

[Dragon arc capture]—the0th time a game—beginning—first—GREE—member registration! [Online]—FAMI—the connoisseur App, Apr. 23, 2012, and the Internet ,URL:https://app.famitsu.com/20120423_56232/> (Document showing a well-known technique) (with partial English translation).

\* cited by examiner

FIG. 4A

| USER ID | PASSWORD | NAME | CHARACTER IMAGE | GAME FRIEND USER ID | ... |
|---|---|---|---|---|---|
| P_001 | XXXX | USER 1 | Pc1.jpg | P_001, P_005、... | ... |
| P_002 | XXXX | USER 2 | Pc2.jpg | P_001, P_003、... | ... |
| ... | ... | ... | ... | ... | ... |

FIG. 4B

| USER ID | PASSWORD | NAME | AVATAR IMAGE | SNS APPLICATION FRIEND USER ID | ... |
|---|---|---|---|---|---|
| P_001 | XXXX | USER 1 | Pa1.jpg | P_003, P_005、... | ... |
| P_004 | XXXX | USER 4 | Pa4.jpg | P_001, P_006、... | ... |
| ... | ... | ... | ... | ... | ... |

FIG. 4C

| REWARD ID | REWARD |
|---|---|
| I_001 | ×××× |
| I_002 | ○○○○ |
| ... | ... |

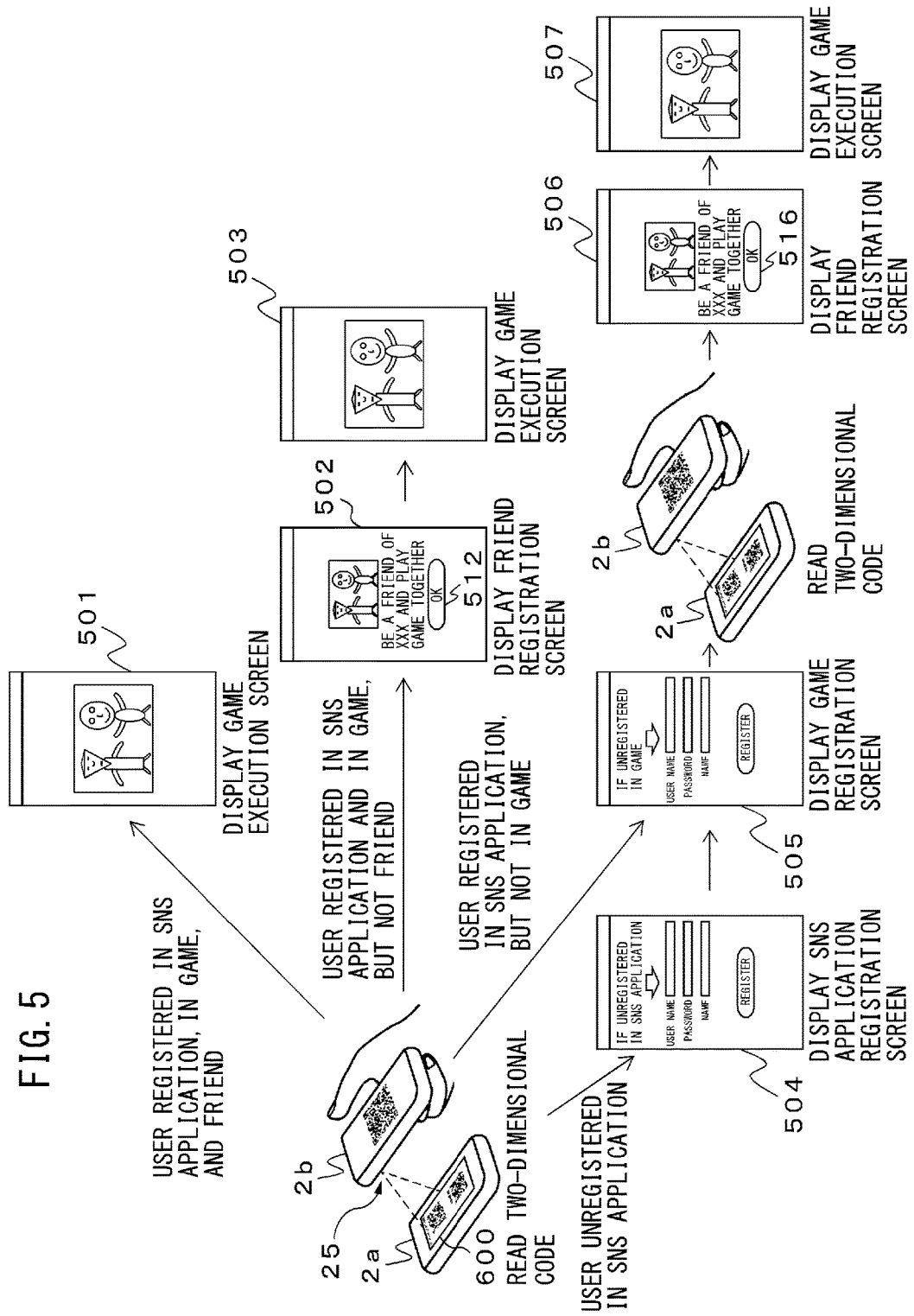

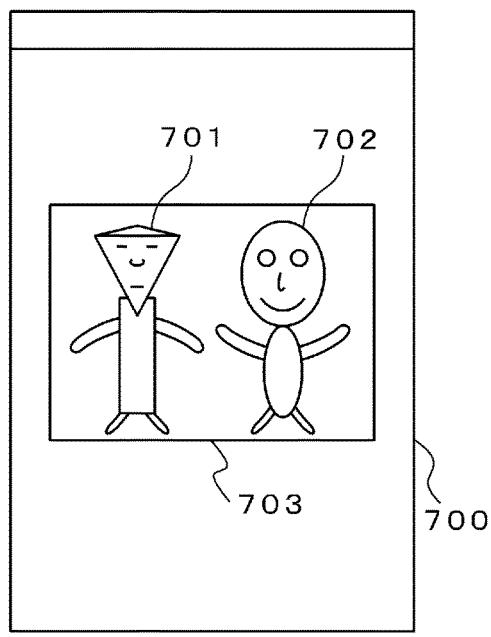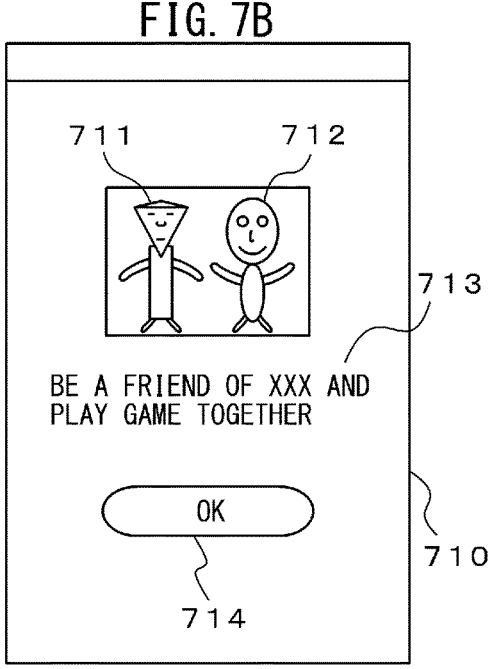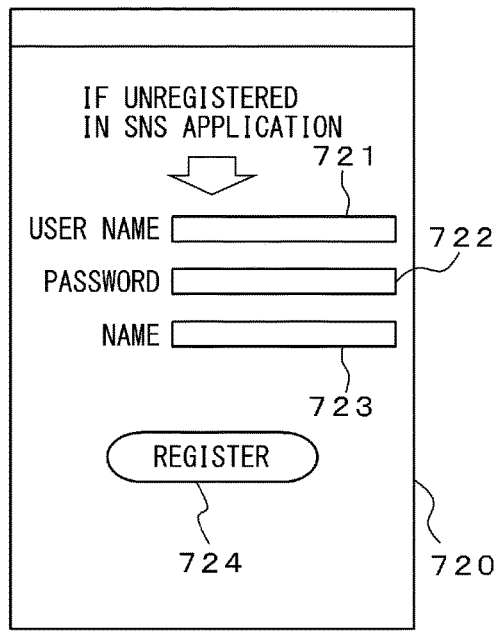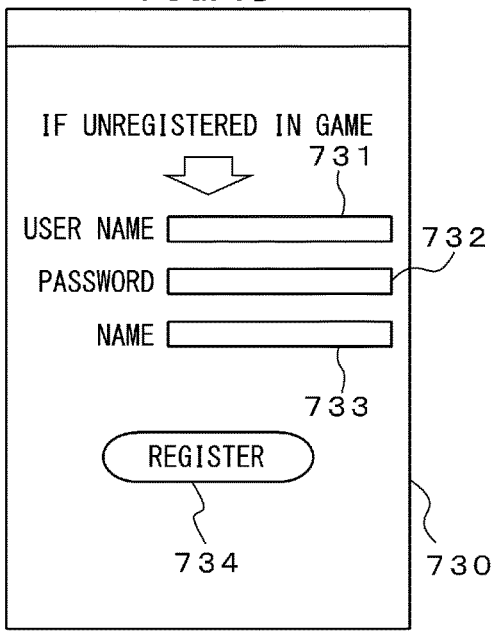

LET'S BE CONNECTED
WITH FRIENDS
1301

1300

1301

LET YOUR FRIEND
READ SELECTED CODE

1302

LET'S BE CONNECTED
WITH FRIENDS

1310

1311

LET YOUR FRIEND
READ SELECTED CODE

1312

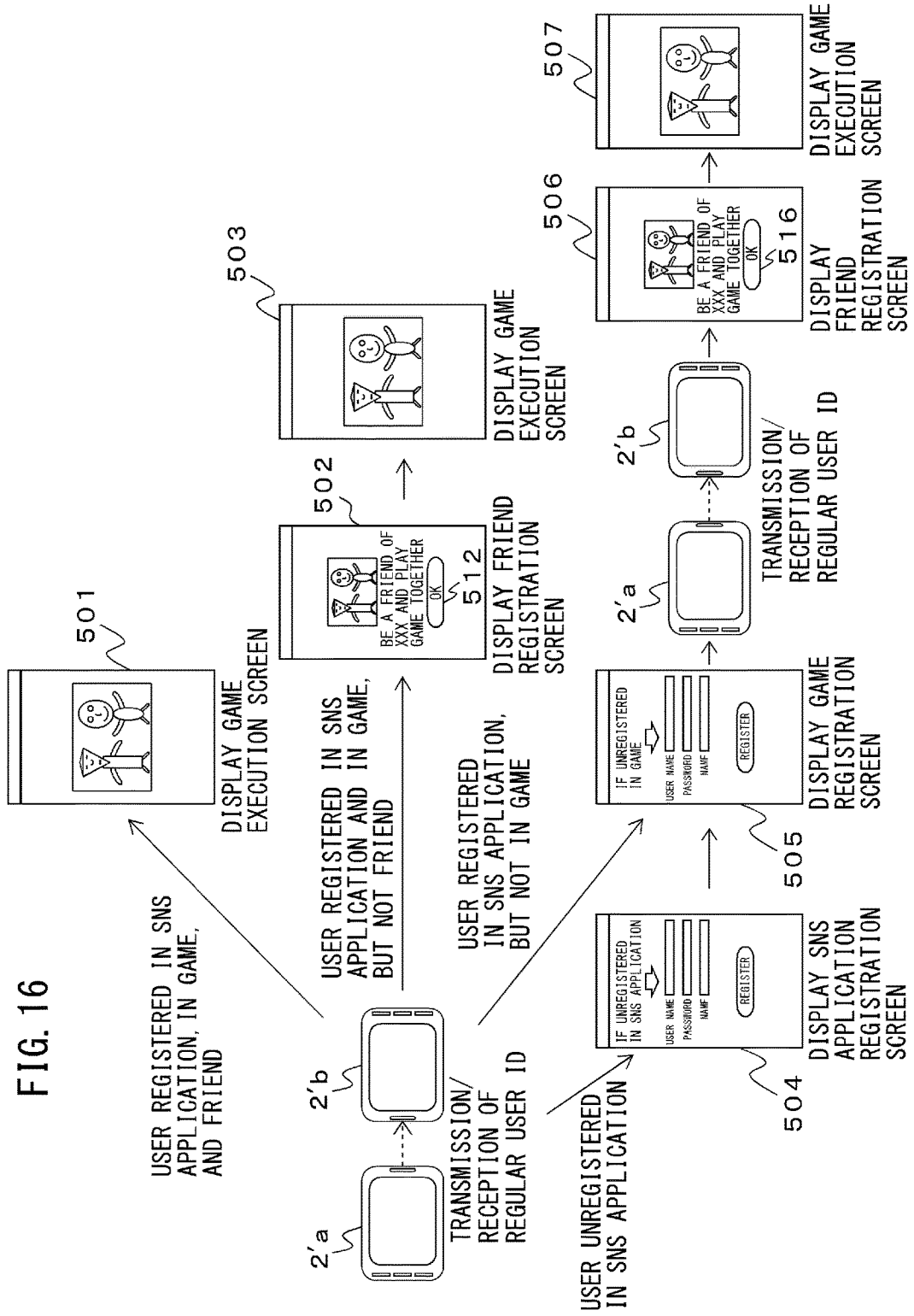

SYSTEM AND METHOD FOR VIDEO GAME USER REGISTRATION BASED ON GAME PROGRESS

CROSS-REFERENCE TO RELATED APPLICATIONS

This application is based upon and claims the benefit of priority of prior Japanese Patent Application No. 2014-135350, filed on Jun. 30, 2014, the entire contents of which are incorporated herein by reference.

TECHNICAL FIELD

Embodiments discussed in the present specification relate to a control technology.

BACKGROUND

In recent years, servers that provide games to portable devices through a communication network have become available. The games provided by the servers include those that accept participation of a plurality of users (a so called "social game").

Japanese Laid Open Patent Publication No. 2013-225290 discloses a social game in which the user thereof can build a friendship with another user for the game to participate together in the game. For example, the user can fight an enemy in the game in cooperation with another user with whom the friendship has been built.

In the social game according to Japanese Laid Open Patent Publication No. 2013-225290, in order for the user to build a friendship with a specific user and start the game, the user has to be registered in the same social networking service (SNS) in which the specific user is registered. In addition, the user has to go through a complicated and troublesome procedure to build the friendship for the game directly with the specific user.

It is an object of the disclosed control method, control program, and computer to allow a user to easily start a game on the basis of a relationship among users, without the need to go through a complicated and troublesome procedure.

SUMMARY

According to an aspect of a control method, there is provided a control method performed by a system which is capable of connecting to a first terminal device of a first user and a second terminal device of a second user different from the first user, the system including a storage module, the first terminal device including a photographing module or a wireless communication module. The method for controlling progress of a game played by a user registered in an application includes storing, in the storage module, identification information of each of a plurality of users in association with registration information indicating whether the user is registered in the application, and character image data, retrieving identification information of the second user from the second terminal device by using the photographing module or the wireless communication module of the first terminal device, retrieving a game progress request including identification information of the first user from the first terminal device and the retrieved identification information of the second user, determining whether or not the first user is registered in the application, transmitting to the first terminal device, first display data for displaying a game screen in the game, when the first user is registered in the application, and transmitting second display data to the first terminal device for displaying a registration screen for registering the first user in the application, when the first user is not registered in the application.

According to an aspect of the control method, the storing in the storage module includes storing identification information of a plurality of each of the users in association also with identification information of another user in the application, the control method further includes determining whether or not the identification information of the second user is associated with the identification information of the first user, when the first user is registered in the application, and displaying at least a character of the first user and a character of the second user by extracting character image data corresponding to the identification information of the first user and the identification information of the second user included in the game progress request in the game screen, when the identification information of the second user is associated with the identification information of the first user, and displaying a screen for associating the identification information of the second user with the identification information of the first user in the game screen, when the identification information of the second user is not associated with the identification information of the first user.

According to an aspect of the control method, the storing in the storage module includes storing the identification information of each of the users in association also with game registration information indicating whether or not the user is registered in the game, the control method further includes determining whether or not the first user is registered in the game when the first user is registered in the application, and displaying a game registration screen for registering the first user in the game in the game screen, when the first user is not registered in the game.

According to an aspect of the control method, the game progress request further includes identification information of a third user retrieved by the first terminal device by photographing the displayed image with the photographing module, the control method further includes determining whether or not the identification information of the third user is associated with the identification information of the first user, when the first user is registered in the application, and displaying at least the character of the first user and a character of the third user in the game screen, when the identification information of the third user is associated with the identification information of the first user.

According to an aspect of the control method, the control method further includes displaying a plurality of images generated on the basis of different types of reward identification information, on the second terminal device, storing in the storage module a plurality of rewards each associated with reward identification information corresponding to one of the plurality of displayed images, granting a reward associated with the reward identification information to at least one of the first user and the second user, retrieving reward identification information by the first terminal device by photographing one of the plurality of displayed images with the photographing module, and wherein the game progress request further includes the reward identification information.

According to an aspect of the control method, the control method further includes displaying, on the second terminal device, a three-dimensional object including the plurality of images respectively located on the faces of the three-dimensional object, the plurality of images being selectable by operation of the user.

According to an aspect of a computer-readable, non-transitory medium, there is provided a computer-readable, non-transitory medium storing a control program for controlling a system including a storage module and controlling progress of a game played by a user registered in an application, wherein the system is capable of connecting to a first terminal device of a first user and a second terminal device of a second user different from the first user, the system including a storage module, the first terminal device including a photographing module or a wireless communication module, the control program causing the computer to execute a process. The process includes storing in the storage module identification information of each of a plurality of users in association with registration information indicating whether the user is registered in the application, and character image data, retrieving identification information of the second user from the second terminal device by using the photographing module or the wireless communication module of the first terminal device, retrieving a game progress request including identification information of the first user from the first terminal device and the retrieved identification information of the second user, determining whether the first user is registered in the application, transmitting to the first terminal device, first display data for displaying a game screen in the game, when the first user is registered in the application, and transmitting second display data to the first terminal device for displaying a registration screen for registering the first user in the application, when the first user is not registered in the application.

According to an aspect of the computer-readable, non-transitory medium, the storing in the storage module includes storing identification information of a plurality of each of the users in association also with identification information of another user in the application, the process further includes determining whether or not the identification information of the second user is associated with the identification information of the first user, when the first user is registered in the application, and displaying at least a character of the first user and a character of the second user by extracting character image data corresponding to the identification information of the first user and the identification information of the second user included in the game progress request in the game screen, when the identification information of the second user is associated with the identification information of the first user, and displaying a screen for associating the identification information of the second user with the identification information of the first user in the game screen, when the identification information of the second user is not associated with the identification information of the first user.

According to an aspect of the computer-readable, non-transitory medium, the storing in the storage module includes storing the identification information of each of the users in association also with game registration information indicating whether or not the user is registered in the game, the process further includes determining whether or not the first user is registered in the game when the first user is registered in the application, and displaying a game registration screen for registering the first user in the game in the game screen, when the first user is not registered in the game.

According to an aspect of the computer-readable, non-transitory medium, the game progress request further includes identification information of a third user retrieved by the first terminal device by photographing the displayed image with the photographing module, and the process further includes determining whether or not the identification information of the third user is associated with the identification information of the first user, when the first user is registered in the application, and displaying at least the character of the first user and a character of the third user in the game screen, when the identification information of the third user is associated with the identification information of the first user.

According to an aspect of the computer-readable, non-transitory medium, the process further includes displaying a plurality of images generated on the basis of different types of reward identification information, on the second terminal device, storing in the storage module a plurality of rewards each associated with reward identification information corresponding to one of the plurality of displayed images, granting a reward associated with the reward identification information to at least one of the first user and the second user, retrieving reward identification information by the first terminal device by photographing one of the plurality of displayed images with the photographing module, wherein the game progress request further includes the reward identification information.

According to an aspect of the computer-readable, non-transitory medium, the process further includes displaying, on the second terminal device, a three-dimensional object including the plurality of images respectively located on the faces of the three-dimensional object, the plurality of images being selectable by operation of the user.

According to an aspect of a system, there is provided a system for controlling progress of a game played by a user registered in an application, the system being capable of connecting to a first terminal device of a first user and a second terminal device of a second user different from the first user, the first terminal device including a photographing module or a wireless communication module, the system includes a storage module for storing therein identification information of each of a plurality of users in association with registration information indicating whether the user is registered in the application, and character image data, a first retrieval module for retrieving a game progress request including identification information of the first user from the first terminal device and identification information of the second user retrieved from the second terminal device by using the photographing module or the wireless communication module of the first terminal device, a first determination module for determining whether or not the first user is registered in the application, and a transmission module for transmitting to the first terminal device, first display data for displaying a game screen in the game, when the first user is registered in the application, and transmitting second display data to the first terminal device for displaying a registration screen for registering the first user in the application, when the first user is not registered in the application.

According to an aspect of the system, the storage module further stores identification information of a plurality of each of the users in association also with identification information of another user in the application, the system further includes a second determination module for determining whether or not the identification information of the second user is associated with the identification information of the first user, when the first user is registered in the application, and wherein the transmission module transmits to the first terminal device, the first display data for displaying at least a character of the first user and a character of the second user by extracting character image data corresponding to the identification information of the first user and the identification information of the second user included in the game progress request in the game screen, when the identification information of the second user is associated with the identification information of the first user, and displaying a screen for associating the identification information of the second user with the identification information of the first user in the game screen, when the identification information of the second user is not associated with the identification information of the first user.

According to an aspect of the system, the storage module further stores the identification information of each of the users in association also with game registration information indicating whether or not the user is registered in the game, the system further includes a third determination module for determining whether or not the first user is registered in the game when the first user is registered in the application, and wherein the transmission module transmits to the first terminal device, the first display data for displaying a game registration screen for registering the first user in the game in the game screen, when the first user is not registered in the game.

According to an aspect of the system, wherein the game progress request further includes identification information of a third user retrieved by the first terminal device by photographing the displayed image with the photographing module, and the system further includes a fourth determination module for determining whether or not the identification information of the third user is associated with the identification information of the first user, when the first user is registered in the application, and wherein the transmission module transmits to the first terminal device, the first display data for displaying at least the character of the first user and a character of the third user in the game screen, when the identification information of the third user is associated with the identification information of the first user.

According to an aspect of the system, wherein the storage module further stores a plurality of rewards each associated with reward identification information corresponding to one of the plurality of displayed images, the second terminal device displays a plurality of images generated on the basis of different types of reward identification information, the system further includes a grant module for granting a reward associated with the reward identification information to at least one of the first user and the second user, a second retrieval module for retrieving reward identification information by the first terminal device by photographing one of the plurality of displayed images with the photographing module, wherein the game progress request further includes the reward identification information.

According to an aspect of the system, wherein the second terminal device displays a three-dimensional object including the plurality of images respectively located on the faces of the three-dimensional object, the plurality of images being selectable by operation of the user.

With the control method, the control program, and the computer, the user can easily start a game on the basis of the relationship among the users, without the need to go through a complicated and troublesome procedure.

BRIEF DESCRIPTION OF DRAWINGS

Other features and advantages of the present invention will be apparent from the ensuing description, taken in conjunction with the accompanying drawings, in which:

FIG. 4A is a diagram illustrating an example of data structure of a game user management table.

FIG. 4B is a diagram illustrating an example of data structure of an SNS application user management table.

FIG. 4C is a diagram illustrating an example of data structure of a reward management table.

FIG. 5 is a schematic diagram for describing screen transitions of the portable device 2.

FIGS. 7A to 7D are diagrams each illustrating an example of the display screen of the portable device 2.

FIG. 16 is a schematic diagram for describing screen transitions of the portable device 2'.

DESCRIPTION OF EMBODIMENTS

Figure 1:
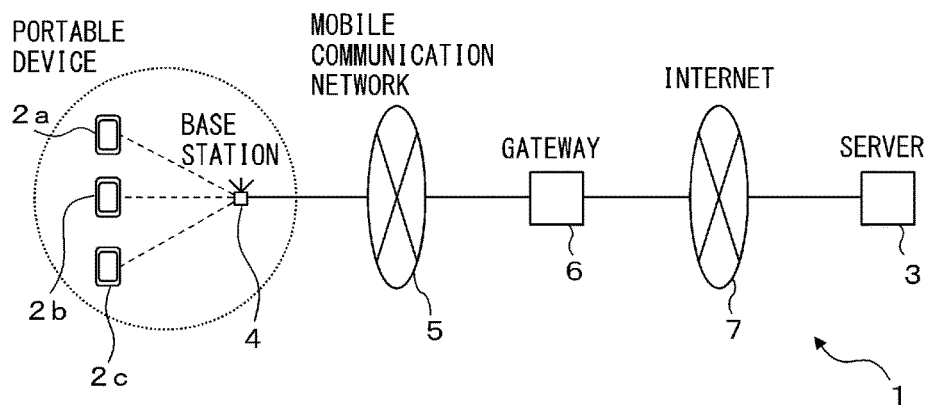
FIG. 1 is a diagram illustrating an example of a general configuration of a game system 1.

Hereafter, embodiments will be described with reference to the drawings. It is to be noted that the technical scope of this application is in no way limited to the following embodiments, but covers this application defined in the appended claims and equivalents thereof.

(1) Outline of Embodiment

In a game system according to this embodiment, a plurality of users play a game provided by a server, using portable devices. Hereinafter, a user who is already a member of the game system and can display his/her identification (ID) on the portable device will be referred to as regular user, and the ID of the regular user will be referred to as regular user ID. A user about to participate in the game system will be referred to as new user, and the ID of the new user will be referred to as new user ID.

In the game system, a regular user can play the game provided by the server when the regular user is registered both in the game and in the SNS application.

The user registered in the game refers to a user registered to play the game provided by the server, in which the user ID, the password, the name, and so forth of the user is stored. The user registered in the SNS application refers to a user registered to execute the SNS application provided by the server, in which the user ID, the password, the name, and so forth of the user are stored. The SNS application is an example of applications other than games, and provided by the server to the user's portable device.

The portable device owned by the regular user registered in the game transmits the regular user ID and the password to the server, and requests display data for displaying a game execution screen (hereinafter, referred to as game execution screen display data). The game execution screen refers to a screen that can be displayed on the portable device authenticated with the regular user ID, and in which a game space associated with the regular user ID is drawn. Characters, items, and so forth associated with the regular user ID are displayed in the game space. The portable device of the regular user can output drawing data generated on the basis of the game execution screen display data received from the server.

In the game system, a quick response (QR) code ("QR code" is a registered trademark), which is a two-dimensional code, is generated on the basis of the regular user ID. The new user can retrieve the regular user ID by photographing the QR code displayed on the portable device of the regular user. The regular user ID and the new user ID may be any type of information provided that the information allows the user to be uniquely identified. In addition, information other than the two-dimensional QR code may be displayed on the portable device of the regular user. For example, a still image, a moving image, or text information such as numerals or characters may be displayed.

The portable device of the new user who has retrieved the regular user ID requests the server to provide the game execution screen display data including the new user ID and the regular user ID. The server determines, upon receipt of the request for the game execution screen display data, whether or not the new user is registered in the SNS application.

When the new user is registered in the SNS application, the server transmits the display data for displaying the game screen to the portable device of the new user. When the new user is not registered in the SNS application, the server transmits display data for displaying a registration screen for the new user to be registered in the SNS application, to allow the new user to execute the SNS application. The game screen also includes, in addition to the game execution screen, screens related to procedures for the game, such as a friend registration screen and a game registration screen.

When the new user is registered in the SNS application, the server further determines whether the new user is a friend of the regular user in the SNS application. When the new user is a friend of the regular user, the server transmits the game execution screen display data including the character of the new user and the character of the regular user, to the portable device of the new user. When the new user is not a friend of the regular user, the server transmits friend registration screen display data for the new user to be registered as a friend of the regular user, to the portable device of the new user.

The friend is an example of a user associated with a specific user in the game or in the SNS application, and such users are stored in the server in association with each other. When the users are in a friend status in the game, the server manages the user ID of one user and the user ID of another user in association with each other, with respect to the game. When the users are in a friend status in the SNS application, the server manages the user ID of one user and the user ID of another user in association with each other, with respect to the SNS application.

Thus, in the game to be played on the basis of the friend status in the SNS application, the user can easily make access to the game execution screen, without the need to go through a complicated procedure.

(2) Configuration of Game System 1

FIG. 1 is a diagram illustrating an example of a general configuration of the game system 1.

The game system 1 includes a plurality of portable devices 2a, 2b, 2c, and a server 3. The portable devices 2a, 2b, 2c are terminal devices having similar configurations. Hereafter, the portable devices 2a, 2b, 2c may be simply referred to as portable device 2. The portable device 2 and the server 3 are connected to each other via a communication network, for example via a base station 4, a mobile communication network 5, a gateway 6, and the Internet 7. A program executed by the portable device 2 (for example, browsing program) and a program executed by the server 3 (for example, game program) communicate with each other using a communication protocol such as the hypertext transfer protocol (HTTP).

(2.1) Configuration of Portable Device 2

Figure 2:
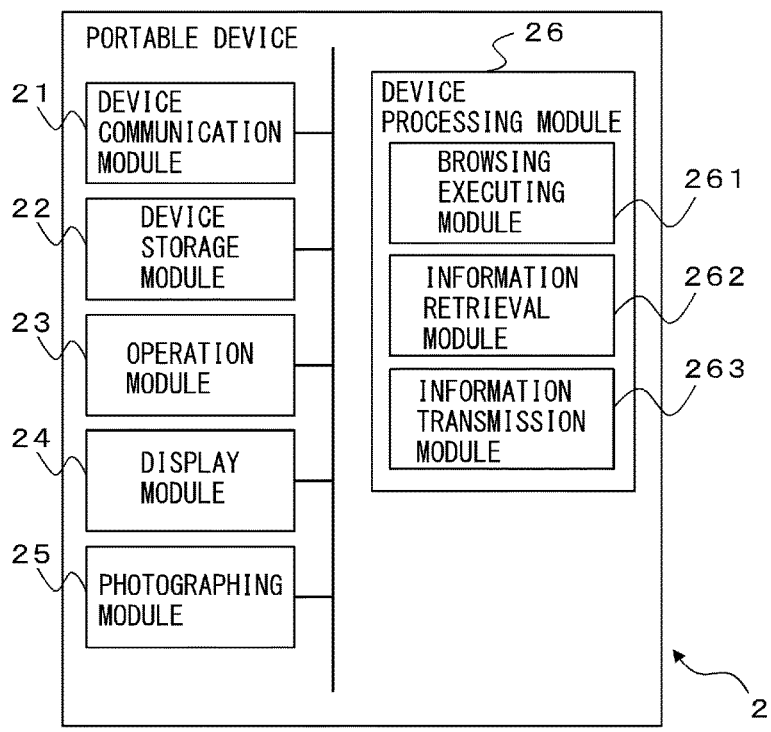
FIG. 2 is a diagram illustrating an example of a general configuration of a portable device 2.

FIG. 2 is a diagram illustrating an example of a general configuration of the portable device 2.

The portable device 2 is connected to the server 3 via the base station 4, the mobile communication network 5, the gateway 6, and the Internet 7, for communication with the server 3. The portable device 2 executes a game provided by the server 3 in accordance with instructions inputted by the user through an operation module (for example, buttons). To this end, the portable device 2 includes a device communication module 21, a device storage module 22, an operation module 23, a display module 24, a photographing module 25, and a device processing module 26.

In this embodiment, the portable device 2 will be assumed to be a multifunctional mobile phone, widely known as smartphone, however the portable device 2 may be a different device. The portable device 2 may be any device provided that this application is applicable, for example a mobile phone (so called feature phone), a portable information terminal device such as a personal digital assistant (PDA), a portable game console, a portable music player, or a tablet PC.

The device communication module 21 includes a communication interface circuit including an antenna sensitive to a specific frequency band, and serves to connect the portable device 2 to the wireless communication network. The device communication module 21 establishes a wireless signal line, for example based on the code division multiple access (CDMA) method, for communication with the base station 4 through a channel assigned by the base station 4. The device communication module 21 transmits data provided from the device processing module 26 to the server 3. The device communication module 21 also provides data received from the server 3 to the device processing module 26.

The device storage module 22 includes, for example, a semiconductor memory. The device storage module 22 stores therein an operating system program, a driver program, an application program, and data, to be utilized for the processing in the device processing module 26. Examples of the driver program stored in the device storage module 22 include an input device driver program for controlling the operation module 23, and an output device driver program for controlling the display module 24. Examples of the application program stored in the device storage module 22 include a program for retrieving and displaying the display data related to the game, provided by the server 3. The computer program may be installed in the device storage module 22 with a known setup program, from a computer-readable portable recording medium such as a compact disk read-only memory (CD-ROM) or a digital versatile disk read-only memory (DVD-ROM).

Examples of the data stored in the device storage module 22 include the user ID which is the identification information of the user of the portable device 2, the display data, picture data, and image data related to the game and received from the server 3. Further, the device storage module 22 may temporarily store transitory data related to a predetermined process.

The operation module 23 may be constituted of any device provided that the device is capable of operating the portable device 2, and is typically exemplified by a touch pad and a keyboard. The user can input characters and numerals through the operation module 23. The operation module 23 generates, upon being operated by the user, a signal corresponding to the operation. The signal thus generated is inputted to the device processing module 26 as an instruction of the user.

The display module 24 may also be constituted of any device provided that the device is capable of displaying pictures and images, and is typically exemplified by a touch panel display device, an LCD and an organic electroluminescence (EL) display. The display module 24 displays pictures corresponding to the picture data provided from the device processing module 26, and images corresponding to the image data provided therefrom.

The photographing module 25 includes an imaging optical system, an imaging device, and an image processing module. The imaging optical system includes an optical lens for example, and forms an image based on the luminous flux from a subject, on the imaging surface of the imaging device. The imaging device may be for example a charge coupled device (CCD) or a complementary metal oxide semiconductor (CMOS), and outputs an image signal representing the image of the subject formed on the imaging surface. The image processing module generates image data of a predetermined file format, on the basis of the image signal generated by the imaging device, and outputs the image data.

The device processing module 26 includes one or a plurality of processors, and peripheral circuits thereof. The device processing module 26 performs centralized control of the overall operation of the portable device 2, and is constituted of, for example, a central processing module (CPU). The device processing module 26 controls the operation of the first communication module 21, the display module 24 and so forth, so as to allow the processing of the portable device 2 to be executed through appropriate procedures in accordance with the programs stored in the device storage module 22 and the instructions from the operation module 23. The device processing module 26 executes the processing in accordance with the programs stored in the device storage module 22 (operating system program, driver program, application program, and so forth). The device processing module 26 is capable of executing a plurality of programs (for example, application programs) in parallel.

(2.1.1) Configuration of Device Processing Module 26

The device processing module 26 includes a browsing executing module 261, an information retrieval module 262, and an information transmission module 263. These modules are functional modules realized by the program executed by the processor of the device processing module 26. Alternatively, those modules may be implemented in the portable device 2 in the form of firmware.

The browsing executing module 261 executes the game provided by the server 3 in accordance with instructions inputted by the user through the operation module 23. Upon receipt of the instruction to start the game from the user through the operation module 23, the browsing executing module 261 further receives the user ID and the password through the operation module 23, and transmits a game start request including the received user ID and password to the server 3 through the device communication module 21.

The user ID and the password may be stored in the device storage module 22 in advance, and the browsing executing module 261 may retrieve the user ID and the password by reading out from the device storage module 22. The server 3 transmits, upon succeeding in authentication with the user ID and the password, home screen display data for displaying a home screen to be subsequently described, to the portable device 2. The browsing executing module 261 is also capable of executing the SNS application provided by the server 3, in accordance with the instruction inputted by the user through the operation module 23.

Upon receipt of the home screen display data from the server 3 through the device communication module 21, the browsing executing module 261 generates drawing data based on the received home screen display data. To be more detailed, the browsing executing module 261 analyzes the received home screen display data to identify control data and content data, and arranges the layout of the identified content data according to the identified control data, thereby generating the drawing data. Then the browsing executing module 261 outputs the generated drawing data to the display module 24.

The browsing executing module 261 also transmits, in accordance with the instruction inputted by the user through the operation module 23, a game progress request including a type of request specified in the instruction, to the server 3 through the device communication module 21. The game progress request is one of a game execution screen request requesting the game execution screen display data, a friend registration request requesting association of the user with the regular user ID, a game registration request requesting user registration for playing the game, and an SNS application registration request requesting user registration for executing the SNS application. The game progress request is identified as one of the game execution screen request, the friend registration request, the game registration request, and the SNS application registration request, according to the type of request specified in the game progress request.

The browsing executing module 261 receives the corresponding display data from the server 3 through the device communication module 21 in response to the game progress request, and generates the drawing data corresponding to the received display data and outputs the drawing data to the display module 24.

The information retrieval module 262 retrieves the user ID of another user on the basis of the two-dimensional code image data obtained by photographing the two-dimensional code displayed on the portable device of the another user with the photographing module 25. The information retrieval module 262 outputs the retrieved user ID of the another user (regular user ID) to the information transmission module 263, together with the user ID of the portable device 2 (new user ID). The information retrieval module 262 may be realized by a known application program for reading the two-dimensional code.

The information transmission module 263 generates the game execution screen request for requesting the server to provide the game execution screen display data, and transmits the generated game execution screen request to the server 3 through the device communication module 21, as the game progress request. The game execution screen request includes both of the regular user ID and the new user ID received from the information retrieval module 262.

(2.2) Configuration of Server 3

Figure 3:
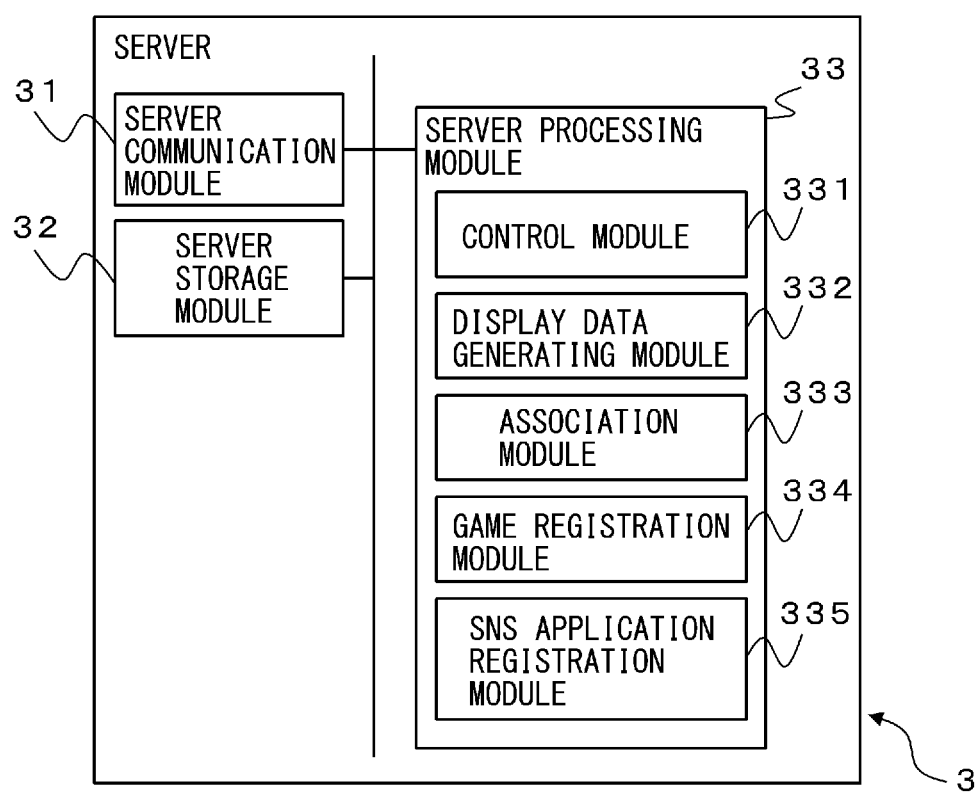
FIG. 3 is a diagram illustrating an example of a general configuration of a server 3.

FIG. 3 is a diagram illustrating an example of a general configuration of the server 3.

The server 3 is an example of the computer that manages the game. The server 3 provides the game in response to the request from the portable device 2, and performs association between the users, user registration for the game, and user registration for the SNS application. The server 3 also generates the display data according to the request from the portable device 2 and transmits the display data to the portable device 2. To this end, the server 3 includes a server communication module 31, a server storage module 32, and a server processing module 33.

The server communication module 31 includes a wired communication interface circuit such as Ethernet (registered trademark) for connecting the server 3 to the Internet 7, for communication with the Internet 7. The server communication module 31 provides the data received from the portable device 2 to the server processing module 33. The server communication module 31 also transmits the data provided by the server processing module 33 to the portable device 2.

The server storage module 32 includes at least one of, for example, a semiconductor memory, a magnetic tape device, a magnetic disk device, and an optical disk device. The server storage module 32 stores therein an operating system program, a driver program, an application program, and data used for the processing performed in the server processing module 33. An example of the application program stored in the server storage module 32 is a game program in which the user creates a character and makes the character play a minigame, and a reward is granted to the user depending on the result of the minigame. The computer program may be installed in the device storage module 22 with a known setup program, from a computer-readable portable recording medium such as a CD-ROM or a DVD-ROM.

Examples of the data stored in the server storage module 32 include a game user management table (see FIG. 4A) for managing the user registered in the game, an SNS application user management table (see FIG. 4B) for managing the user registered in the SNS application, and a reward management table (see FIG. 4C) for managing the reward. Further, the server storage module 32 may temporarily store transitory data related to a predetermined process.

FIG. 4A is a diagram illustrating an example of data structure of the game user management table. The game user management table contains, with respect to each of the users, the user ID, the password, the name, a file name of the character image data, and the game friend user ID, in association with each other. The user ID is the information for uniquely identifying the user, composed of, for example, a character string made up by the user, the mail address of the user, or information randomly determined by the server 3. The character image data represents the character of the user displayed on the game execution screen.

The game friend user ID is the user ID of another user associated with the user in the game. For example, when two users become friends of each other in the game, the game friend user ID of one user contains the user ID of the other user, and the game friend user ID of the latter user contains the user ID of the former user.

FIG. 4B is a diagram illustrating an example of data structure of the SNS application user management table. SNS application user management table contains, with respect to each of the users, the user ID, the password, the name, a file name of avatar image data, and the SNS application friend user ID, in association with each other. The user ID stored in the game user management table and the user ID stored in the SNS application user management table may be the same or different. The subsequent description will be given on the assumption that the same user ID is stored in the both user management tables. The avatar image data refers to data representing the avatar of the user displayed on the execution screen of the SNS application.

The SNS application friend user ID is the user ID of another user associated with the user in the SNS application. For example, when two users become friends of each other in the SNS application, the SNS application friend user ID of one user contains the user ID of the other user, and the SNS application friend user ID of the latter user contains the user ID of the former user.

FIG. 4C is a diagram illustrating an example of data structure of the reward management table. The reward management table contains a reward ID and the reward in association with each other. The reward ID is information for uniquely identifying the reward. The reward is, for example, an item that the character of the user retrieves in the game, or an experience point given to the character of the user.

The server processing module 33 includes one or a plurality of processors and peripheral circuits thereof. The server processing module 33 performs centralized control of the overall operation of the server 3, and is constituted of, for example, a CPU. The server processing module 33 controls the operation of the server communication module 31 and so forth, so as to allow the processing of the server 3 to be executed through appropriate procedures in accordance with the programs stored in the server storage module 32. The server processing module 33 executes the processing in accordance with the programs stored in the server storage module 32 (operating system program, driver program, application program, and so forth). The server processing module 33 is capable of executing a plurality of programs (for example, application programs) in parallel.

(2.2.1) Function of Server Processing Module 33

FIG. 5 is a schematic diagram for describing screen transitions of the portable device 2. The description will be given below refers to the case where the new user makes access to the game execution screen displayed on the portable device 2a of the regular user, with the portable device 2b of the new user.

As illustrated in FIG. 5, first the two-dimensional code generated on the basis of the regular user ID is displayed on the portable device 2a of the regular user. The portable device 2b of the new user retrieves the regular user ID by photographing the two-dimensional code displayed on the portable device 2a of the regular user with the photographing module 25 of the portable device 2b.

Figure 6:
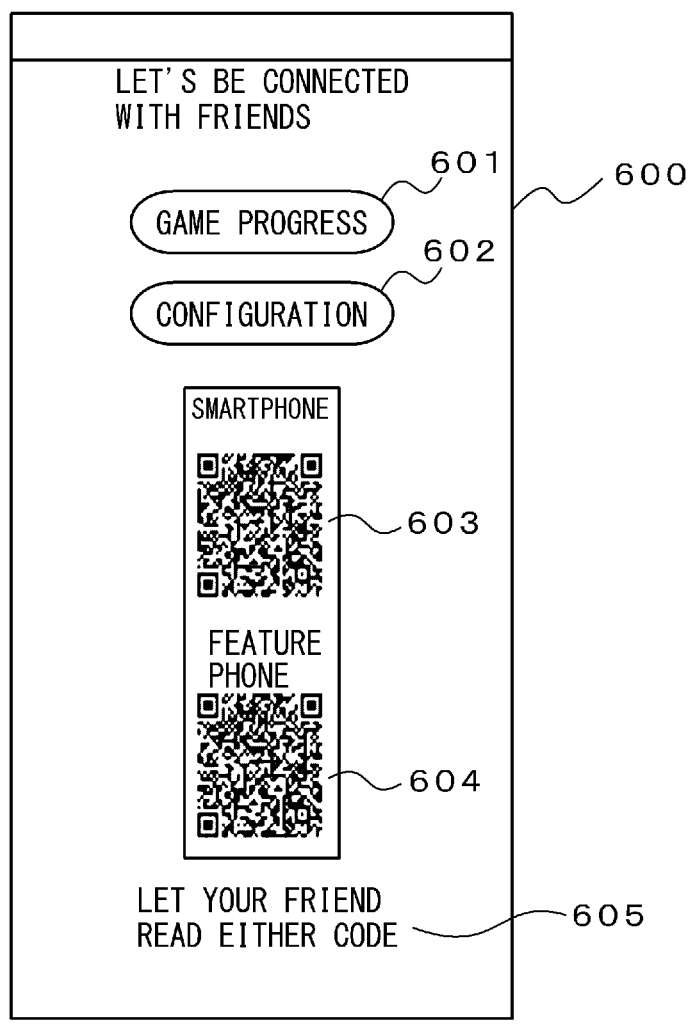
FIG. 6 is a diagram illustrating an example of a display screen of the portable device 2.

FIG. 6 is a diagram illustrating an example of a home screen 600 displayed on the portable device 2a of the regular user. The home screen 600 displays a game progress button 601, a configuration button 602, the two-dimensional code 603 for smartphone, the two-dimensional code 604 for feature phone, and a message on how to use the two-dimensional codes 603 and 604.

When the game progress button 601 is tapped, the browsing executing module 261 of the portable device 2a transmits the game progress request for proceeding with the game to the server 3 through the device communication module 21. The browsing executing module 261 outputs the drawing data generated on the basis of the game execution screen display data received from the server 3 in response to the game progress request, to the display module 24.

When the configuration button 602 is tapped, the browsing executing module 261 transmits to the server 3 a request for the display data for displaying the screen through which setting information necessary for progress with the game is to be inputted. The browsing executing module 261 then receives the display data generated in accordance with the request, and outputs the drawing data generated on the basis of the received display data, to the display module 24.

The two-dimensional codes 603 and 604 are generated on the basis of the regular user ID. Displaying both of the two-dimensional code 603 for smartphone and the two-dimensional code 604 for feature phone on the portable device 2a of the regular user at the same time allows reduction of the number of redirecting times for displaying the two-dimensional codes 603 and 604.

The message 605 on how to use the two-dimensional codes 603 and 604 urges the user to read the displayed two-dimensional code 603 or 604 into the portable device 2b of the new user. The message 605 allows the new user to recognize that the two-dimensional code displayed on the portable device 2a of the regular user can be directly shot with the photographing module 25 of the portable device 2b of the new user.

Back to FIG. 5, the server 3 determines whether the new user is registered in the SNS application, whether the new user is registered in the game, and whether the new user is a friend of the regular user.

When the new user is registered in the SNS application, registered in the game, and a friend of the regular user, the portable device 2b of the new user displays a game execution screen 501.

FIG. 7A illustrates a game execution screen 700 exemplifying the game execution screen 501 in FIG. 5. The game execution screen 700 is displayed on the portable device 2b of the new user when the portable device 2b of the new user makes access to the server 3 on the basis of the regular user ID retrieved by photographing the two-dimensional code displayed on the portable device 2a of the regular user.

A game space 703 including a character 701 of the new user and a character 702 of the regular user is displayed on the game execution screen 700. The game space associated with the regular user ID, which the portable device that has succeeded in the authentication with the regular user ID is allowed to display, is drawn on the game execution screen 700. For example the character or item associated with the regular user ID is displayed in the game space 703. A game such as a battle or competition, or a game for clearing a quest in cooperation may be displayed in the game space 703, with the character 701 of the new user and the character 702 of the regular user. The portable device 2a of the regular user displays the game execution screen 700, also when the game progress button 601 in the home screen 600 illustrated in FIG. 6 is tapped on the portable device 2a of the regular user.

Back again to FIG. 5, when the new user is registered in the SNS application and registered in the game, but not a friend of the regular user, the portable device 2b of the new user displays a friend registration screen 502 for registering the new user as a friend of the regular user. When the friend registration button 512 in the friend registration screen 502 is tapped, the portable device 2b of the new user transmits the friend registration request requesting the registration of the new user as a friend of the regular user, to the server 3.

FIG. 7B illustrates a friend registration screen 710 exemplifying the friend registration screen 502 in FIG. 5. The friend registration screen 710 displays a character 711 of the new user, a character 712 of the regular user, a message 713 announcing an advantage of being associated, for example becoming a friend, for the game, and a friend registration button 714 for associating the new user with the regular user. Displaying the characters 711 and 712 allows the new user to confirm the appearance of the character about to become a friend, thereby encouraging the new user to make the friend registration. Likewise, displaying the message 713 allows the new user to retrieve the information of the advantage obtainable from the game, thereby urging the new user to make the friend registration.

Returning to FIG. 5, when the friend registration button 512 in the friend registration screen 502 is tapped and the friend registration request is transmitted to the server, the portable device 2b of the new user displays a game execution screen 503. For example, the game execution screen 700 illustrated as FIG. 7A is displayed as the game execution screen 503.

When the new user is not registered in the SNS application, the portable device 2b of the new user displays an SNS application registration screen 504 for the new user to be registered in the SNS application.

FIG. 7C illustrates a SNS application registration screen 720 exemplifying the SNS application registration screen 504 in FIG. 5. The SNS application registration screen 720 displays a user name input box 721 for inputting the user's name, a password input box 722 for inputting the password, a name input box 723 for inputting the name, and an SNS application registration button 724 for instructing the registration in the SNS application. When the SNS application registration button 724 is tapped after the input boxes 721 to 723 are filled in, the portable device 2b of the new user transmits the SNS application registration request including the inputted information, i.e., the user ID, the password, and the name, to the server 3.

Returning to FIG. 5, after the new user is registered in the SNS application through the SNS application registration screen 504, the portable device 2b of the new user displays a game registration screen 505 for the new user to be registered in the game.

FIG. 7D illustrates a game registration screen 730 exemplifying the game registration screen 505 in FIG. 5. The game registration screen 730 displays a user name input box 731 for inputting the user's name, a password input box 732 for inputting the password, a name input box 733 for inputting the name, and a game registration button 734 for instructing the registration in the game. When the game registration button 734 is tapped after the input boxes 731 to 733 are filled in, the portable device 2b of the new user transmits the game registration request including the inputted information, i.e., the user ID, the password, and the name, to the server 3.

Returning to FIG. 5, after the new user is registered in the game through the game registration screen 505, the portable device 2b of the new user displays a non-illustrated retrieval screen urging the new user to again shoot the two-dimensional code displayed on the portable device 2a of the regular user.

Then, the portable device 2b of the new user retrieves the regular user ID by photographing the two-dimensional code displayed on the portable device 2a of the regular user.

After retrieving the regular user ID, the portable device 2b of the new user displays a friend registration screen 506 for the new user to be registered as a friend of the regular user. For example, as the friend registration screen 710 illustrated as FIG. 7B is displayed as the friend registration screen 506.

When a friend registration button 516 in the friend registration screen 506 is tapped and the friend registration request is transmitted to the server 3, the portable device 2b of the new user displays a game execution screen 507. For example, the game execution screen 700 illustrated as FIG. 7A is displayed as the game execution screen 507 in FIG. 5.

When the new user is registered in the SNS application but not registered in the game, the portable device 2b of the new user displays the game registration screen 505 for the new user to be registered in the game. The screen transition subsequent to the game registration screen 505 is the same as in the case where the new user is not registered in the SNS application.

As illustrated in FIG. 5 to FIGS. 7A to 7D, the portable device 2b of the new user displays one of the game execution screen 501, the friend registration screen 502, the SNS application registration screen 504, and the game registration screen 505, depending on whether the new user is registered in the SNS application, whether the new user is registered in the game, and whether the new user is a friend of the regular user. Such an arrangement allows the user to easily start the game on the basis of the relationship between the users, without the need to go through a complicated and troublesome procedure.

(2.2.2) Configuration of Server Processing Module 33

To realize the foregoing functions, the server processing module 33 includes, as illustrated in FIG. 3A, a control module 331, a display data generating module 332, an association module 333, a game registration module 334, and an SNS application registration module 335. These modules are functional modules realized by the program executed by the processor of the server processing module 33. Alternatively, those modules may be implemented in the server 3 in the form of firmware.

Hereunder, the operation performed by the control module 331 will be described. The control module 331 controls the progress of the game, and instructs the display data generating module 332, the association module 333, the game registration module 334, and the SNS application registration module 335 to execute a processing as the case may be.

The control module 331 transmits, upon receipt of the game start request from the portable device 2a of the regular user through the server communication module 31, the regular user ID and the password included in the received game start request to a non-illustrated user authentication module, to instruct the authentication of the SNS application and the game.

When the authentication by the user authentication module has succeeded, the control module 331 generates the two-dimensional code on the basis of the regular user ID, using a known two-dimensional code generation algorithm. The server 3 may generate two types of two-dimensional codes, for the smartphone and the feature phone.

The control module 331 generates the home screen display data for displaying the home screen including the two-dimensional code, and transmits the home screen display data to the portable device 2 through the server communication module 31.

Upon receipt of the game progress request from the portable device 2 through the server communication module 31, the control module 331 identifies whether the game progress request is the game execution screen request requesting the game execution screen display data, the friend registration request requesting association of the user with the regular user ID, the game registration request requesting registration of the user for playing the game, or the SNS application registration request requesting registration of the user for executing the SNS application, according to the type of the request included in the game progress request.

When the identified request is the game execution screen request, the control module 331 transfers the new user ID and the regular user ID included in the game execution screen request to the display data generating module 332, and instructs the display data generating module 332 to generate the game execution screen display data. The control module 331 transmits the display data generated by the display data generating module 332 to the portable device 2 through the server communication module 31.

When the identified request is the friend registration request, the control module 331 transfers the new user ID and the regular user ID included in the friend registration request to the association module 333, and instructs the association module 333 to execute the association. The control module 331 transmits the game execution screen display data generated by the display data generating module 332 to the portable device 2 through the server communication module 31.

When the identified request is the SNS application registration request, the control module 331 transfers the new user ID, the password, the name, and the file name of the avatar image data included in the SNS application registration request to the SNS application registration module 335, and instructs the SNS application registration module 335 to execute the registration. The SNS application registration module 335 transfers the game registration screen display data generated by the display data generating module 332 to the control module 331. The control module 331 transmits the game registration screen display data received from the SNS application registration module 335 to the portable device 2 through the server communication module 31.

When the identified request is the game registration request, the control module 331 transfers the new user ID, the password, the name, and the file name of the character image data included in the game registration request to the game registration module 334, and instructs the game registration module 334 to perform the game registration. The game registration module 334 transfers the generated retrieval screen display data to the control module 331. The control module 331 transmits the retrieval screen display data received from the game registration module 334 to the portable device 2 through the server communication module 31.

Hereunder, the operation performed by the display data generating module 332 will be described. The display data generating module 332 generates the display data in accordance with the instruction from the control module 331, and transfers the generated display data to the control module 331.

The display data generating module 332 determines, upon receipt of the instruction to generate the game execution screen display data, whether the new user is registered in the SNS application. In more detail, the display data generating module 332 looks up the SNS application user management table stored in the server storage module 32, and determines whether the new user ID received from the control module 331 is registered in the SNS application user management table. When the new user is not registered in the SNS application, the display data generating module 332 generates the SNS application registration screen display data for displaying the user name input box 721, the password input box 722, the name input box 723, and the SNS application registration button 724 in a predetermined layout, and transfers the SNS application registration screen display data to the control module 331.

When the new user is registered in the SNS application, the display data generating module 332 determines whether the new user is registered in the game. To be more detailed, the display data generating module 332 looks up the game user management table stored in the server storage module 32, and determines whether the new user ID received from the control module 331 is registered in the game user management table. When the new user is not registered in the game, the display data generating module 332 generates the game registration screen display data for displaying the user name input box 731, the password input box 732, the name input box 733, and the game registration button 734 in a predetermined layout, and transfers the game registration screen display data to the control module 331.

When the new user is registered in the game, the display data generating module 332 determines whether the new user is a friend of the regular user. In more detail, the display data generating module 332 looks up the game user management table stored in the server storage module 32, and determines whether the regular user ID received from the control module 331 is stored in association with the friend user ID corresponding to the new user ID received from the control module 331.

When the new user is not a friend of the regular user, the display data generating module 332 generates the friend registration screen display data. To be more detailed, the display data generating module 332 looks up the game user management table stored in the server storage module 32, and extracts the character image data corresponding to the new user ID and the regular user ID received from the control module 331, as the character of the new user and the character of the regular user, respectively. The display data generating module 332 generates the friend registration screen display data for displaying the friend registration screen including the character of the new user and the character of the regular user. The display data generating module 332 transfers the generated friend registration screen display data to the control module 331.

When the new user is a friend of the regular user, the display data generating module 332 generates the game execution screen display data. To be more detailed, the display data generating module 332 looks up the game user management table stored in the server storage module 32, and extracts the character image data corresponding to the new user ID and the regular user ID received from the control module 331, as the character of the new user and the character of the regular user, respectively. The display data generating module 332 generates the game execution screen display data for displaying the game execution screen including the character of the new user and the character of the regular user which have been extracted, and transfers the game execution screen display data to the control module 331.

The display data generating module 332 also generates the game registration screen display data in accordance with the instruction from the SNS application registration module 335, and transfers the generated game registration screen display data to the SNS application registration module 335.

The operation performed by the association module 333 will be described hereunder. The association module 333 establishes the association in accordance with the instruction from the control module 331, and instructs the display data generating module 332 to generate the game execution screen display data.

The association module 333 registers the new user as a friend of the regular user. Upon receipt of the association instruction, the association module 333 stores the regular user ID received from the control module 331 in the game user management table, in association with the game friend user ID corresponding to the new user ID received from the control module 331. In addition, the association module 333 stores new user ID received from the control unit 331 in association with the game friend user ID corresponding to the regular user ID received from the control unit 331. Alternatively, the regular user ID and the new user ID may be stored in association with the SNS application friend ID corresponding to the new user ID and the regular user ID in the SNS application user management table.

The association module 333 transfers the new user ID and the regular user ID associated with each other to the display data generating module 332, and instructs the display data generating module 332 to generate the game execution screen display data. The display data generating module 332 generates the game execution screen display data when the new user is a friend of the regular user, and transfers the game execution screen display data to the association module 333. The association module 333 transfers the received game execution screen display data to the control module 331.

The operation performed by the game registration module 334 will be described hereunder. The game registration module 334 performs the game registration in accordance with the instruction from the control module 331, and generates the retrieval screen display data and transfers the same to the control module 331.

The game registration module 334 performs the user registration for executing the game. Upon receipt of the instruction for game registration, the game registration module 334 adds a data record including the new user ID, the password, the name, and the file name of the character image data received from the control module 331, to the game user management table stored in the server storage module 32. The game registration module 334 generates the retrieval screen display data including the message urging the new user to shoot the two-dimensional code displayed on the portable device of the regular user, and transfers the retrieval screen display data to the control module 331.

Hereunder, the operation performed by the SNS application registration module 335 will be described. The SNS application registration module 335 performs the SNS application registration in accordance with the instruction from the control module 331, and instructs the display data generating module 332 to generate the game registration screen display data. The SNS application registration module 335 transfers the received game registration screen display data to the control module 331.

The SNS application registration module 335 performs the user registration for executing the SNS application. Upon receipt of the instruction for SNS application registration, the SNS application registration module 335 adds a data record including the new user ID, the password, the name, and the file name of the avatar image data received from the control module 331, to the SNS application user management table stored in the server storage module 32. The SNS application registration module 335 instructs the display data generating module 332 to generate the game registration screen display data for registering the new user in the game, and transfers the game registration screen display data received from the display data generating module 332 to the control module 331.

(3) Operation of Game System 1

Figure 8:
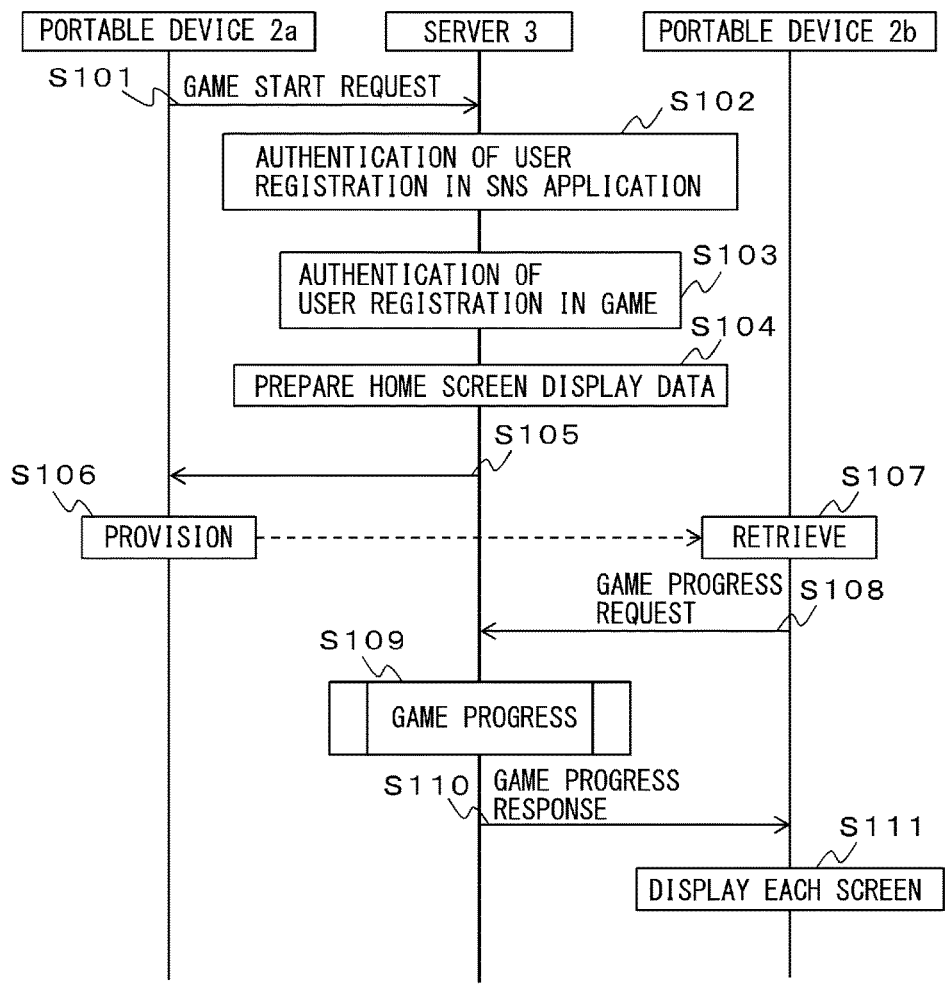
FIG. 8 is a sequence chart illustrating an operation sequence of the game system 1.

FIG. 8 illustrates an example of the operation sequence of the game system 1. The operation sequence described below is primarily performed by the device processing module 26 and the server processing module 33 in collaboration with the modules in the portable device 2 and the server 3, in accordance with the programs stored in advance in the device storage module 22 and the server storage module 32.

The regular user inputs an instruction to start the game through the operation module 23 of the portable device 2a. The browsing executing module 261 receives the regular user ID and the password through the operation module 23, and transmits a game start request including the received regular user ID and password to the server 3 through the device communication module 21 (step S101).

The control module 331 of the server 3 transmits, upon receipt of the game start request from the portable device 2a through the server communication module 31, the regular user ID and the password included in the game start request to the user authentication module, and instructs the user authentication module to authenticate that the regular user is registered in the SNS application (step S102).

When the authentication by the user authentication module with respect to the SNS application is successful, the control module 331 instructs the user authentication module to authenticate that the regular user is registered in the game (step S103).

When the authentication by the user authentication module with respect to the game is successful, the control module 331 generates the two-dimensional code on the basis of the regular user ID, using a known two-dimensional code generation algorithm. The control module 331 then generates the home screen display data for displaying the home screen including the two-dimensional code (step S104).

The control module 331 then transmits the generated home screen display data to the portable device 2a through the server communication module 31 (step S105).

The browsing executing module 261 of the portable device 2a generates, upon receipt of the home screen display data from the server 3 through the device communication module 21, the drawing data based on the received home screen display data. The browsing executing module 261 then outputs the generated drawing data to the display module 24 so as to display the home screen including the two-dimensional code (step S106).

The photographing module 25 of the portable device 2b of the new user shoots the two-dimensional code according to the instruction inputted by the user of the portable device 2b through the operation module 23. The information retrieval module 262 of the portable device 2b retrieves the regular user ID on the basis of the two-dimensional code image data shot by the photographing module 25 of the portable device 2b (step S107).

The information retrieval module 262 outputs the retrieved regular user ID to the information transmission module 263, together with the new user ID.

The information transmission module 263 receives the new user ID and the regular user ID. The information transmission module 263 transmits the game execution screen request including the new user ID and the regular user ID as the game progress request to the server 3 through the device communication module 21, to retrieve the display data (step S108).

The control module 331 of the server 3 identifies, upon receipt of the game progress request from the portable device 2 through the server communication module 31, whether the game progress request is the game execution screen request, the friend registration request, the game registration request, or the SNS application registration request, according to the type of the request included in the received game progress request. The modules in the server processing module 33 generate the display data of the respective screens, on the basis of the received game progress request and the content specified in the user management tables stored in the server storage module 32, and transfer the generated screen display data to the control module 331 (step S109). The details of the game progress will be subsequently described.

The control module 331 transmits the screen display data received from the modules in the server processing module 33 to the portable device 2b through the server communication module 31 (step S110).

The browsing executing module 261 of the portable device 2b generates, upon receipt of the screen display data from the server 3 through the device communication module 21, the drawing data based on the received screen display data. The browsing executing module 261 then outputs the generated drawing data to the display module 24, so as to display the corresponding screen (step S111). Thereafter, the operations of steps S108 to S111 are repeated.

Figure 9:
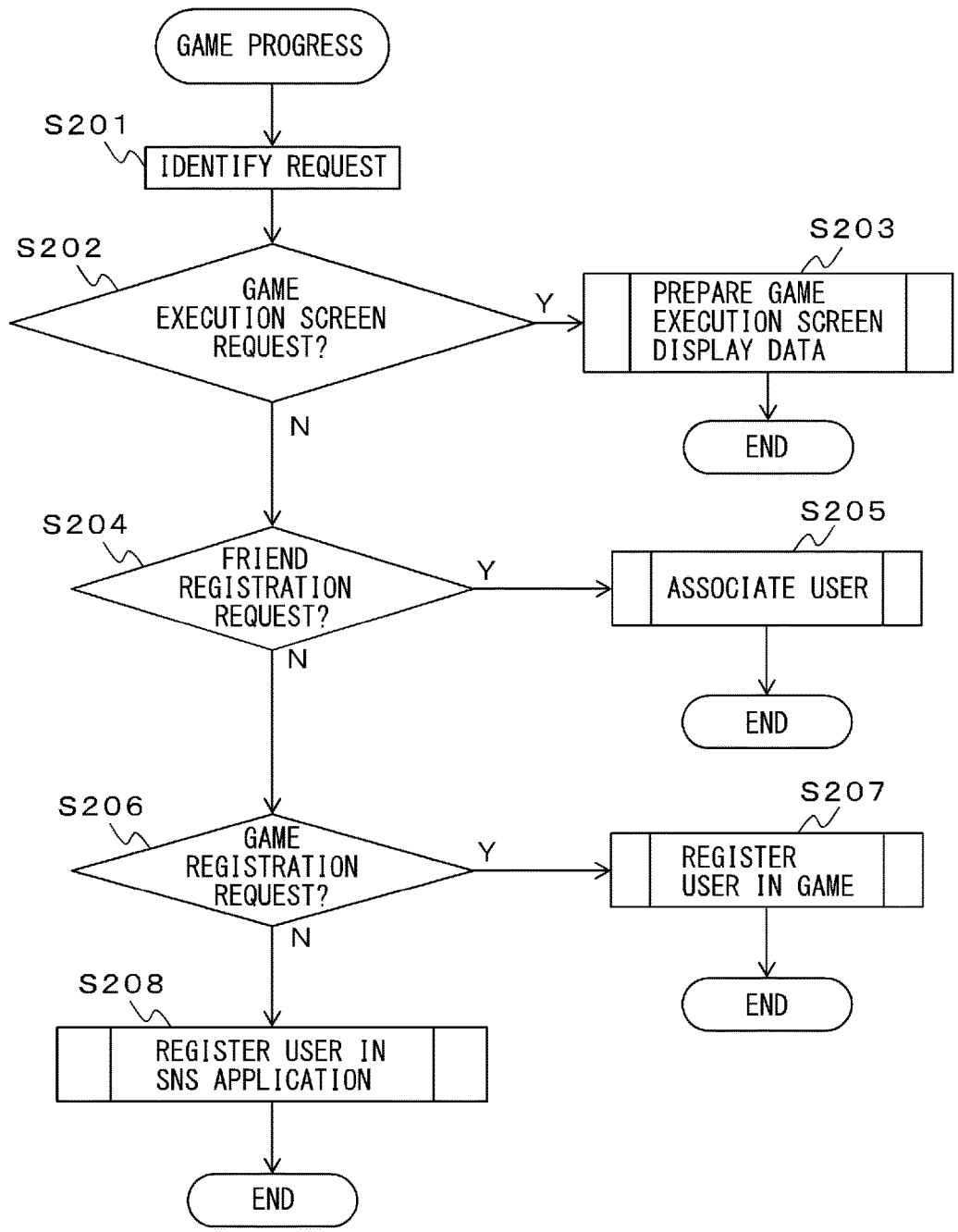
FIG. 9 is a flowchart illustrating an operation flow of a game executing procedure.

FIG. 9 is a flowchart of the operations of the modules in the server processing module 33 for progressing with the game. The game progress illustrated in FIG. 9 is performed at step S109 in FIG. 8.

First, the control module 331 identifies, upon receipt of the game progress request from the portable device 2 through the server communication module 31, the request from the portable device 2b according to the type of the request included in the game progress request (step S201).

When the identified request is the game execution screen request (Yes at step S202), the control module 331 instructs the display data generating module 332 to generate the game execution screen display data. The display data generating module 332 generates the game execution screen display data in accordance with the game execution screen request (step S203), and finishes the series of steps. The details of the generation of the game execution screen display data will be subsequently described.

When the request identified at step S201 is the friend registration request (No at step S202, Yes at step S204), the control module 331 instructs the association module 333 to establish the association.

The association module 333 establishes the association (step S205), and finishes the series of steps. The details of the association process will be subsequently described.

When the request identified at step S201 is the game registration request (No at step S204, Yes at step S206), the control module 331 instructs the game registration module 334 to perform the game registration.

The game registration module 334 performs the game registration (step S207), and finishes the series of steps. The details of the game registration will be subsequently described.

When the request identified at step S201 is the SNS application registration request (No at step S206), the control module 331 instructs the SNS application registration module 335 to perform the SNS application registration. The SNS application registration module 335 performs the SNS application registration (step S208), and finishes the series of steps. The details of the SNS application registration will be subsequently described.

Figure 10:
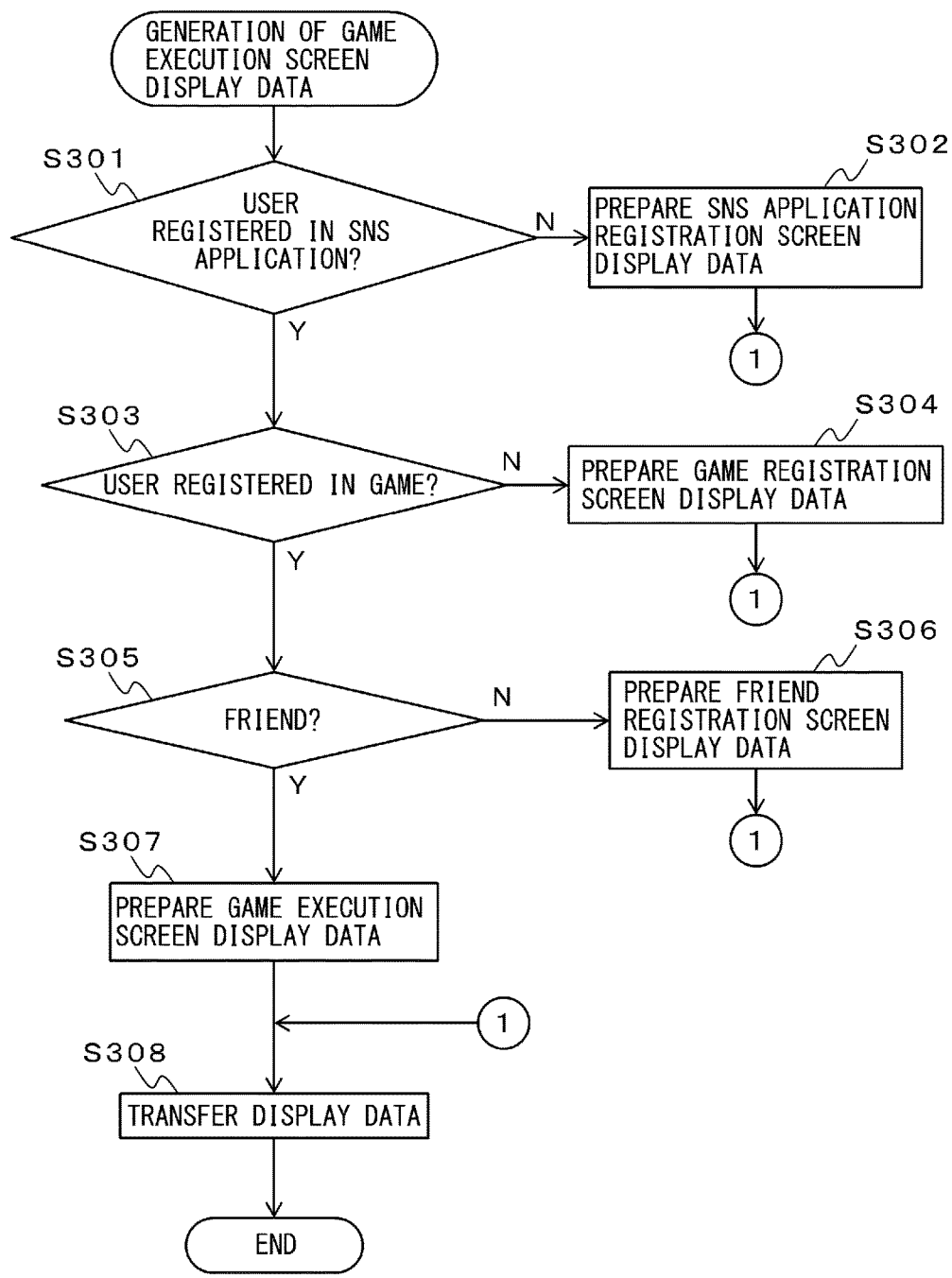
FIG. 10 is a flowchart illustrating an operation flow for generating game execution screen display data.

FIG. 10 illustrates an operation flow for generation of the game execution screen display data by the display data generating module 332. The generation of the game execution screen display data illustrated in FIG. 10 is performed at step S203 in FIG. 9.

First, the display data generating module 332 determines whether the new user is registered (step S301).

When the new user is not registered in the SNS application (No at step S301), the display data generating module 332 generates the SNS application registration screen display data (step S302). The display data generating module 332 then transfers the generated SNS application registration screen display data to the control module 331 (step S308), and finishes the series of steps.

When the new user is registered in the SNS application (Yes at step S301), the display data generating module 332 determines whether the new user is registered in the game (step S303). When the new user is not registered in the SNS application (No at step S303), the display data generating module 332 generates the game registration screen display data (step S304). The display data generating module 332 then transfers the generated game registration screen display data to the control module 331 (step S308), and finishes the series of steps.

When the new user is registered in the game (Yes at step S303), the display data generating module 332 determines whether the new user is a friend of the regular user (step S305).

When the new user is not a friend of the regular user (No at step S305), the display data generating module 332 generates the friend registration screen display data (step S304). The display data generating module 332 then transfers the generated friend registration screen display data to the control module 331 (step S308), and finishes the series of steps.

When the new user is a friend of the regular user (Yes at step S305), the display data generating module 332 generates the game execution screen display data (step S307). The display data generating module 332 then transfers the generated game execution screen display data to the control module 331 (step S308), and finishes the series of steps.

Figure 11:
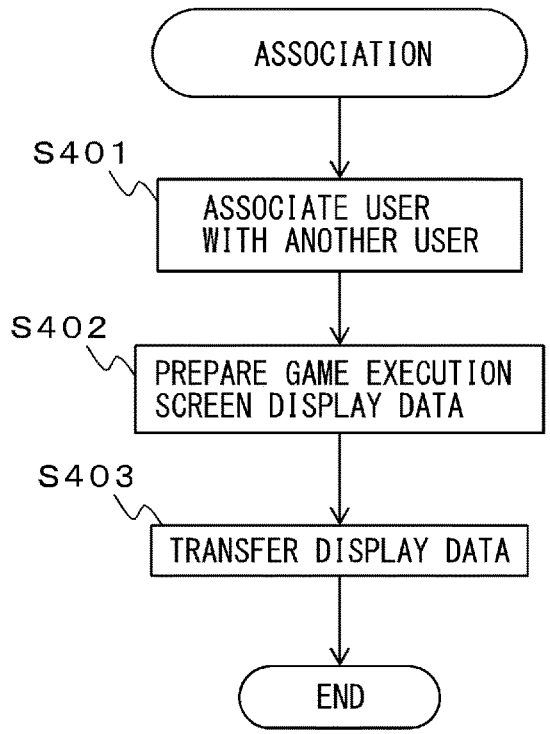
FIG. 11 is a flowchart illustrating an operation flow of an association process.

FIG. 11 illustrates an operation flow of the association process performed by the association module 333 and the display data generating module 332. The association process illustrated in FIG. 11 is performed at step S205 in FIG. 9.

First, upon receipt of the instruction for the association, the association module 333 associates the new user and the regular user ID designated by the control module 331 with each other, in the game user management table (step S401).

Then, the association module 333 instructs the display data generating module 332 to generate the game execution screen display data, and the display data generating module 332 generates the game execution screen display data (step S402).

The display data generating module 332 transfers the generated game execution screen display data to the association module 333, and the association module 333 transfers the received game execution screen display data to the control module 331 (step S403), and finishes the series of steps.

Figure 12:
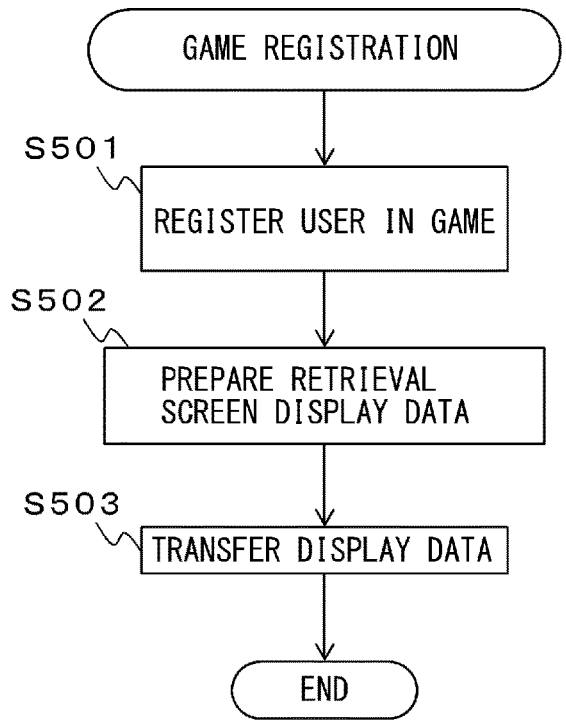
FIG. 12 is a flowchart illustrating an operation flow of user registration in the game.

FIG. 12 illustrates an operation flow of the game registration performed by the game registration module 334. The game registration illustrated in FIG. 12 is performed at step S207 in FIG. 9.

First, upon receipt of the instruction for the game registration, the game registration module 334 registers the user designated by the control module 331 in the game user management table (step S501).

The game registration module 334 generates the retrieval screen display data (step S502).

The game registration module 334 then transfers the generated retrieval screen display data to the control module 331 (step S503), and finishes the series of steps.

Figure 13:
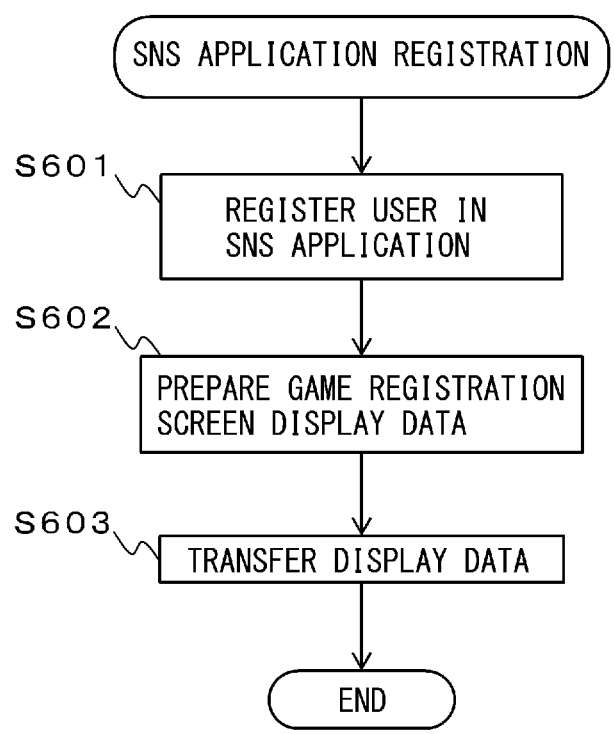
FIG. 13 is a flowchart illustrating an operation flow of user registration in the SNS application.

FIG. 13 illustrates an operation flow of the SNS application performed by the SNS application registration module 335. The SNS application registration illustrated in FIG. 13 is performed at step S208 in FIG. 9.

First, upon receipt of the instruction for the SNS application registration, the SNS application registration module 335 registers the user designated by the control module 331 in the SNS application user management table (step S601).

The SNS application registration module 335 instructs the display data generating module 332 to generate the game registration screen display data. The display data generating module 332 generates the game registration screen display data (step S602), and transfers the generated game registration screen display data to the SNS application registration module 335.

The SNS application registration module 335 then transfers the game registration screen display data received from the display data generating module 332 to the control module 331 (step S603), and finishes the series of steps.

As described thus far, the game system 1 provides a smooth interface for executing the game according to the registration status of the user in the SNS application, thereby allowing the user to easily start the game on the basis of the relationship between the users, without the need to go through a complicated and troublesome procedure. In addition, the game system 1 allows the user to access the page of a friend and immediately start the game with the friend, simply by photographing the two-dimensional code displayed on the portable device of the friend. Such a system eliminates the need for the user to seek the user ID of the friend on the SNS in order to play the game with the friend. Thus, the smooth interface for executing the game according to the friend status between the user and the friend user, or the registration status of the user in the game, is provided. Therefore, a large number of users of different properties can easily participate in the game.

The present invention is not limited to the foregoing embodiment. For example, although the two-dimensional code displayed on the portable device 2a of the regular user is generated on the basis of the regular user ID in the embodiment, the two-dimensional code may be generated on the basis of the user ID of a user other than the regular user (hereinafter, second regular user).

Hereafter, s description will be given of the case in which the second regular user utilizes the portable device 2c. In this case, the portable device 2a of the regular user retrieves the second regular user ID by photographing the two-dimensional code displayed on the portable device 2c of the second regular user. The portable device 2a of the regular user stores the second regular user ID thus retrieved in the device storage module 22 of the portable device 2a of the regular user.

When the instruction to start the game is inputted through the operation module 23 of the portable device 2a, the browsing executing module 261 receives the regular user ID and the password from the regular user through the operation module 23, and transmits the game start request including the received regular user ID and the password, and also the second regular user ID retrieved as above, to the server 3 through the device communication module 21 server 3.

The control module 331 of the server 3 transmits, upon receipt of the game start request from the portable device 2a through the server communication module 31, the regular user ID and the password included in the received game start request to the user authentication module, and instructs the user authentication module to perform the authentication.

When the authentication by the user authentication module is successful, the control module 331 generates the two-dimensional code on the basis of the regular user ID and the second regular user ID. The game start request may include a plurality of second regular user IDs in addition to the regular user ID, in which case the control module 331 generates the two-dimensional code on the basis of the regular user ID and the plurality of second regular user IDs.

The control module 331 generates the home screen display data for displaying the home screen including the two-dimensional code. The control module 331 then transmits the generated home screen display data to the portable device 2a through the server communication module 31.

The portable device 2b of the new user can retrieve the regular user ID and the second regular user ID by photographing the two-dimensional code displayed on the portable device 2a of the regular user. Such an arrangement allows the new user to retrieve the regular user ID and the plurality of second regular user IDs at the same time, and to associate the new user with the regular user and the plurality of second regular users, without the need to go through a complicated procedure.

Although the two-dimensional code displayed on the portable device of the regular user is generated on the basis of the regular user ID in the embodiment, the two-dimensional code may be generated on the basis of the regular user ID and the reward ID.

In this case, when the regular user inputs the instruction to start the game through the operation module 23 of the portable device 2a, the browsing executing module 261 receives the regular user ID and the password from the regular user through the operation module 23, and transmits the game start request including the received regular user ID and the password to the server 3 through the device communication module 21 server 3.

The control module 331 of the server 3 transmits, upon receipt of the game start request from the portable device 2a through the server communication module 31, the regular user ID and the password included in the received game start request to the user authentication module, and instructs the user authentication module to perform the authentication.

When the authentication by the user authentication module is successful, the control module 331 generates the two-dimensional code on the basis of the regular user ID and the reward ID. The control module 331 may randomly select a predetermined number of reward IDs among a plurality of reward IDs, and generate the predetermined number of two-dimensional codes on the basis of the respective reward IDs and the regular user ID. The control module 331 generates the home screen display data for displaying the home screen including the two-dimensional code. The control module 331 then transmits the generated home screen display data to the portable device 2a through the server communication module 31.

Figure 14A:
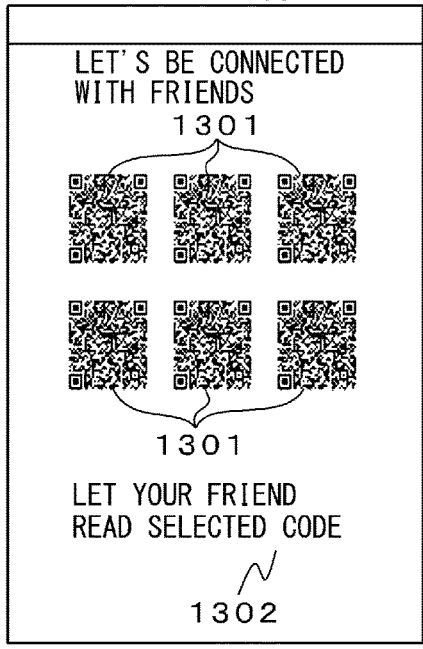
FIGS. 14A and 14B are schematic drawings illustrating other examples of the display screen of the portable device 2.

FIG. 14A illustrates another example of the home screen 1300. The home screen 1300 displays a plurality of two-dimensional codes 1301 and a message 1302 on how to use the plurality of codes 1301.

The portable device 2b of the new user retrieves the regular user ID and the reward ID by photographing the two-dimensional code displayed on the portable device 2a of the regular user. The portable device 2b of the new user transmits the retrieved reward ID to the server 3, and the control module 331 of the server 3 looks up the reward management table illustrated in FIG. 4B and grants the reward corresponding to the received reward ID to the new user. The new user can become a friend of the regular user and obtain the reward by photographing the two-dimensional code displayed on the portable device 2a of the regular user, and is therefore encouraged to shoot the two-dimensional code displayed on the portable device 2a of the regular user. In addition, the new user can participate in a lottery by selecting one of a plurality of two-dimensional codes and photographing the selected one, which further induce the new user to shoot the two-dimensional code.

The control module 331 of the server 3 may grant the reward corresponding to the reward ID to the regular user at the same time as granting the reward to the new user, or grant the reward only to the regular user, and not to the new user. Further, the reward granted to the new user and the reward granted to the regular user may be the same, or predetermined different ones.

Figure 14B:

FIG. 14B illustrates another example of the display screen of the portable device 2 displaying a plurality of two-dimensional codes. The home screen 1310 illustrated in FIG. 14B displays a three-dimensional object 1311 composed of a plurality of codes and a message 1312 on how to use the three-dimensional object 1311. The plurality of two-dimensional codes are located on the respective faces of the three-dimensional object 1311. The browsing executing module 261 of the portable device 2a generates the drawing data of the three-dimensional object 1311 that can be rotated in a desired direction according to the operation of the regular user through the operation module 23. The browsing executing module 261 then outputs the generated drawing data to the display module 24.

With the mentioned arrangement, the new user can rotate the three-dimensional object 1311 composed of a plurality of two-dimensional codes displayed on the portable device 2a through the operation module 23, and shoot the desired two-dimensional code with the portable device 2b of the new user. Therefore, the new user can seek the two-dimensional code on a hidden face of the three-dimensional object, and is further induced to shoot the two-dimensional code.

The two-dimensional code may be generated on the basis of a uniform resource locator (URL) including information for identifying the regular user ID and indicating the storage location of the display data of the screens. In this case, the information transmission module 263 generates the game progress request including the new user ID and the regular user ID, on the basis of the URL retrieved by photographing the two-dimensional code. In addition, in the server implemented with the function of transmitting the game execution screen display data, the game registration screen display data, and the friend registration screen display data to the portable device, the implementation process of existing social games can be alleviated by storing the game execution screen display data, the game registration screen display data, and the friend registration screen display data in the URL to be included in the game progress request.

In the foregoing embodiment, the portable device 2b of the new user retrieves the regular user ID by photographing the two-dimensional code displayed on the portable device 2a of the regular user. Alternatively, wireless communication between terminal devices may be employed to transmit the regular user ID from the portable device 2a of the regular user to the portable device 2b of the new user, instead of the two-dimensional code.

Figure 15:
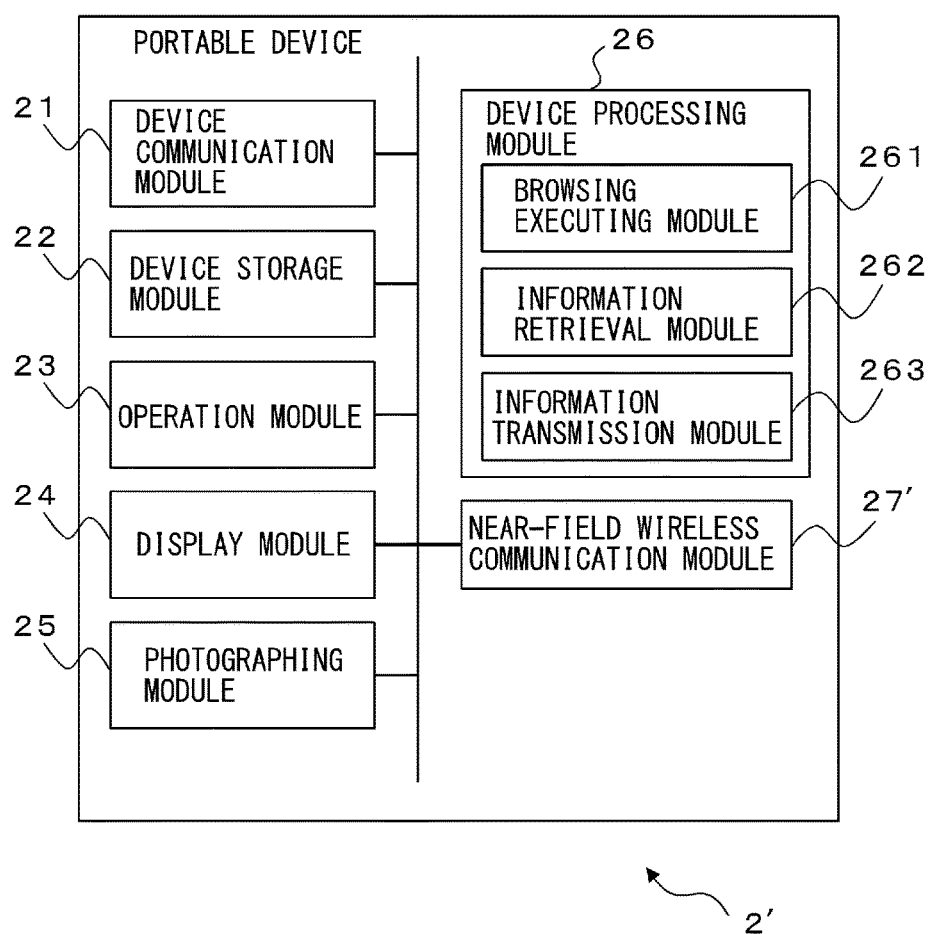
FIG. 15 is a diagram illustrating an example of a general configuration of a portable device 2'.

FIG. 15 is a diagram illustrating an example of a general configuration of portable devices 2' (2'a, 2'b). In this case, the regular user ID is transmitted from the portable device 2'a of the regular user to the portable device 2'b of the new user, through wireless communication. In FIG. 15, the same constituents as those of the portable device 2 illustrated in FIG. 2 are given the same numeral, and the description thereof will not be repeated.

The portable device 2' further includes a near-field wireless communication module 27', in addition to the modules included in FIG. 2. The near-field wireless communication module 27' includes an interface circuit for executing near-field wireless communication according to Bluetooth (registered trademark) specification. The information transmission module 263 of the portable device 2'*a* of the regular user transmits the regular user ID through the near-field wireless communication module 27'. The portable device 2'*b* of the new user receives the regular user ID transmitted through the near-field wireless communication module 27', and transfers the regular user ID to the information retrieval module 262. The near-field wireless communication module 27' is an example of a wireless communication module that includes an interface circuit for executing direct communication between terminal devices.

FIG. 16 is a diagram for describing screen transitions of the portable device 2' configured as above. In FIG. 16, the same constituents as those illustrated in FIG. 5 are given the same numeral, and the description thereof will not be repeated. Referring to FIG. 16, first the portable device 2'*b* of the new user receives the regular user ID from the portable device 2'*a* of the regular user through wireless communication between the devices. Then, the server 3 determines whether the new user is registered in the game and whether the new user is a friend of the regular user.

When the new user is not registered, the portable device 2*b* of the new user displays the game registration screen for registering the new user in the game. After the new user is registered through the game registration screen, the portable device 2'*b* of the new user displays a non-illustrated retrieval screen urging the new user to receive the regular user ID again from the portable device 2'*a* of the regular user through the wireless communication between the devices.

The portable device 2'*b* of the new user again receives the regular user ID again from the portable device 2'*a* of the regular user through the wireless communication between the devices. Upon retrieving the regular user ID, the portable device 2'*b* of the new user displays the friend registration screen for registering the new user as a friend of the regular user.

Through the mentioned steps, in which the two-dimensional code is not involved, the game execution screen displayed on the terminal device of another user can be easily displayed on the terminal device of the user, without the need to go through a complicated procedure.

The server 3 may determine whether the new user is registered in the SNS application depending on whether the new user has logged-in in the SNS application, instead of whether the new user ID is registered in the SNS application user management table. In this case, the server 3 determines, upon receipt of the game execution screen display data from the portable device 2*b* of the new user, that the new user is registered in the SNS application when the authentication of the new user is successful, and that the new user is not registered in the SNS application when the authentication of the new user has failed. Likewise, the server 3 may determine whether the new user is registered in the game depending on whether the new user has logged-in in the game.

It is to be understood that it will be obvious to those skilled in the art that various modifications, substitutions, or amendments may be made without departing from the scope and spirit of this application. In particular, when the game system 1 according to this application acts as the server 3 connected to the portable device 2 via the network, a hybrid game may be set up in which the server 3 and the portable device 2 are each engaged in a part of the processing such that, for example, the game progress screen is displayed on the portable device 2 through the web on the basis of the data generated by the server 3, and the menu screens and so forth are displayed by native applications installed in the portable device 2. Further, the processing of the server 3 may be realized by using a plurality of servers.

What is claimed is:

1. A control method for controlling progress of a game performed by a system which is capable of connecting to a first terminal device of a first user of a plurality of users and a second terminal device of a second user of the plurality of users, the second user different from the first user, the system including circuitry and a storage device, the first terminal device including a photographing device, the control method comprising:

storing, in the storage device, identification information of each of the plurality of users in association with game registration information, the identification information indicating whether or not a corresponding user is registered in the game, and the game registration information indicating whether or not the corresponding user is registered in an application other than the game;

retrieving, by the circuitry, identification information of the second user, who is registered in the game, from the first terminal device, the first terminal device retrieving the identification information of the second user by photographing an image displayed on the second terminal device with the photographing device, the image indicating the identification information of the second user;

retrieving, by the circuitry, a game progress request including identification information of the first user from the first terminal device;

determining, by the circuitry, whether or not the first user is registered in the application;

determining, by the circuitry, whether or not the first user is registered in the game when the circuitry determines that the first user is registered in the application;

transmitting to the first terminal device, by the circuitry, first display data for displaying a game screen in the game when the circuitry determines that the first user is registered in the game;

transmitting to the first terminal device, by the circuitry, second display data for displaying a game registration screen for registering the first user in the game when the circuitry determines that the first user is not registered in the game; and transmitting to the first terminal device, by the circuitry, third display data for displaying a registration screen for registering the first user in the application when the circuitry determines that the first user is not registered in the application.

2. The control method according to claim 1, wherein the storing in the storage device includes storing identification information of each of the plurality of users in association with identification information of another user in the application, and character image data in association with identification information of each of the plurality of users, and the control method further comprising:

determining, by the circuitry, whether or not the identification information of the second user is associated with the identification information of the first user when the circuitry determines that the first user is registered in the application;

displaying at least a character of the first user and a character of the second user by extracting character image data corresponding to the identification information of the first user and the identification information of the second user included in the game progress request in the game screen when the identification information of the second user is associated with the identification information of the first user; and displaying a screen for associating the identification information of the second user with the identification information of the first user in the game screen when the identification information of the second user is not associated with the identification information of the first user.

3. The control method according to claim 1, wherein the game progress request further includes identification information of a third user of the plurality of users, the identification information of the third user being retrieved by the first terminal device by photographing another image displayed on the second terminal device with the photographing device, and the control method further comprising:
storing, in the storage device, character image data in association with identification information of each of the plurality of users;

determining, by the circuitry, whether or not the identification information of the third user is associated with the identification information of the first user when the circuitry determines that the first user is registered in the application; and displaying at least a character of the first user and a character of the third user in the game screen when the circuitry determines that the identification information of the third user is associated with the identification information of the first user.

4. The control method according to claim 1, further comprising:
displaying a plurality of images generated on the basis of different types of reward identification information, on the second terminal device;

storing in the storage device a plurality of rewards each associated with reward identification information corresponding to one of the plurality of displayed images;

granting, by the circuitry, a reward associated with the reward identification information to at least one of the first user and the second user; and retrieving, by the circuitry, reward identification information by the first terminal device by photographing one of the plurality of displayed images with the photographing device, wherein the game progress request further includes the reward identification information.

5. The control method according to claim 4, further comprising displaying, on the second terminal device, a three-dimensional object including the plurality of images respectively located on the faces of the three-dimensional object, the plurality of images being selectable by operation of the first user.

6. A computer-readable, non-transitory medium storing a control program for controlling a system controlling progress of a game, wherein the system is capable of connecting to a first terminal device of a first user of a plurality of users and a second terminal device of a second user of the plurality of users, the second user different from the first user, the system including circuitry and a storage device, the first terminal device including a photographing device, the control program causing the computer to execute a process, the process comprising:

storing, in the storage device, identification information of each of the plurality of users in association with game registration information, the identification information indicating whether or not a corresponding user is registered in the game, and the game registration information indicating whether or not the corresponding user is registered in an application other than the game;

retrieving, from the first terminal device, a game progress request including identification information of the first user and identification information of the second user, the second user being registered in the game, the first terminal device retrieving the identification information of the second user by photographing an image displayed on the second terminal device with the photographing device, the image indicating the identification information of the second user;

determining whether or not the first user is registered in the application;

determining whether or not the first user is registered in the game when the first user is determined to be registered in the application;

transmitting to the first terminal device, first display data for displaying a game screen in the game, when the first user is determined to be registered in the application; and transmitting second display data to the first terminal device for displaying a game registration screen for registering the first user in the game, when the first user is determined to not be registered in the game; and transmitting second display data to the first terminal device for displaying a registration screen for registering the first user in the application, when the first user is determined to not be registered in the application.

7. The computer-readable, non-transitory medium according to claim 6, wherein
the storing in the storage device includes storing identification information of each of the plurality of users in association with identification information of another user in the application, and character image data in association with identification information of each of the plurality of users, the process further comprising:
determining whether or not the identification information of the second user is associated with the identification information of the first user, when the first user is determined to be registered in the application;

displaying at least a character of the first user and a character of the second user by extracting character image data corresponding to the identification information of the first user and the identification information of the second user included in the game progress request in the game screen, when the identification information of the second user is associated with the identification information of the first user; and displaying a screen for associating the identification information of the second user with the identification information of the first user in the game screen, when the identification information of the second user is not associated with the identification information of the first user.

8. The computer-readable, non-transitory medium according to claim 6, wherein
the game progress request further includes identification information of a third user of the plurality of users, the identification information of the third user being retrieved by the first terminal device by photographing another image displayed on the second terminal device with the photographing device, and the process further comprising:

storing, in the storage device, character image data in association with identification information of each of the plurality of users;

determining whether or not the identification information of the third user is associated with the identification information of the first user, when the first user is determined to be registered in the application; and displaying at least the character of the first user and a character of the third user in the game screen, when the identification information of the third user is determined to be associated with the identification information of the first user.

9. The computer-readable, non-transitory medium according to claim 6, the process further comprising:

displaying a plurality of images generated on the basis of different types of reward identification information, on the second terminal device;

storing in the storage device a plurality of rewards each associated with reward identification information corresponding to one of the plurality of displayed images;

granting a reward associated with the reward identification information to at least one of the first user and the second user;

retrieving reward identification information by the first terminal device by photographing one of the plurality of displayed images with the photographing device, wherein the game progress request further includes the reward identification information.

10. The computer-readable, non-transitory medium according to claim 9, the process further comprising displaying, on the second terminal device, a three-dimensional object including the plurality of images respectively located on the faces of the three-dimensional object, the plurality of images being selectable by operation of the first user.

11. A system for controlling progress of a game, the system being capable of connecting to a first terminal device of a first user of a plurality of users and a second terminal device of a second user of the plurality of users, the second user different from the first user, the first terminal device including a photographing device, the system comprising:

a memory for storing therein identification information of each of the plurality of users in association with game registration information, the identification information indicating whether or not a corresponding user is registered in the game, and the game registration information indicating whether or not the corresponding user is registered in an application other than the game; and circuitry configured to retrieve, from the first terminal device, a game progress request including identification information of the first user and identification information of the second user, the second user being registered in the game, the first terminal device retrieving the identification information of the second user by photographing an image displayed on the second terminal device with the photographing device, the image indicating the identification information of the second user;

determine whether or not the first user is registered in the application;

determine whether or not the first user is registered in the game when the circuitry determines that the first user is registered in the application;

transmit to the first terminal device, first display data for displaying a game screen in the game, when the circuitry determines that the first user is registered in the game;

transmit to the first terminal device, second display data for displaying a game registration screen for registering the first user in the game, when the circuitry determines that the first user is not registered in the game; and transmit to the first terminal device, third display data for displaying a registration screen for registering the first user in the application, when the circuitry determines that the first user is not registered in the application.

12. The system according to claim 11, wherein the memory further stores identification information of each of the plurality of users in association also with identification information of another user in the application, and the circuitry is further configured to:

determine whether or not the identification information of the second user is associated with the identification information of the first user, when it is determined that the first user is registered in the application; and transmit to the first terminal device, the first display data for displaying at least a character of the first user and a character of the second user by extracting character image data corresponding to the identification information of the first user and the identification information of the second user included in the game progress request in the game screen when the identification information of the second user is associated with the identification information of the first user, and displaying a screen for associating the identification information of the second user with the identification information of the first user in the game screen when the identification information of the second user is not associated with the identification information of the first user.

13. The system according to claim 11, wherein the game progress request further includes identification information of a third user of the plurality of users, the identification information of the third user being retrieved by the first terminal device by photographing another image displayed on the second terminal device with the photographing device, and the circuitry is further configured to:

store, in the memory, character image data in association with identification information of each of the plurality of users;

determine whether or not the identification information of the third user is associated with the identification information of the first user, when the circuitry determines that the first user is registered in the application; and transmit to the first terminal device, the first display data for displaying at least the character of the first user and a character of the third user in the game screen, when the identification information of the third user is associated with the identification information of the first user.

14. The system according to claim 11, wherein
- the circuitry is configured to store a plurality of rewards each associated with reward identification information corresponding to one of the plurality of displayed images,
- the second terminal device displays a plurality of images generated on the basis of different types of reward identification information,
- the circuitry is further configured to:
  - grant a reward associated with the reward identification information to at least one of the first user and the second user; and
  - retrieve reward identification information by the first terminal device by photographing one of the plurality of displayed images with the photographing device, and
- the game progress request further includes the reward identification information.

15. The system according to claim 14, wherein the second terminal device displays a three-dimensional object including the plurality of images respectively located on the faces of the three-dimensional object, the plurality of images being selectable by operation of the first user.

\* \* \* \* \*